United States Patent
King et al.

(10) Patent No.: US 10,275,516 B2
(45) Date of Patent: Apr. 30, 2019

(54) SYSTEMS AND METHODS FOR KEYWORD DETERMINATION AND DOCUMENT CLASSIFICATION FROM UNSTRUCTURED TEXT

(71) Applicant: PRESIDENT AND FELLOWS OF HARVARD COLLEGE, Cambridge, MA (US)

(72) Inventors: Gary King, Brookline, MA (US); Margaret Roberts, Cambridge, MA (US); Patrick Lam, Cambridge, MA (US)

(73) Assignee: PRESIDENT AND FELLOWS OF HARVARD COLLEGE, Cambridge, MA (US)

(*) Notice: Subject to any disclaimer, the term of this patent is extended or adjusted under 35 U.S.C. 154(b) by 460 days.

(21) Appl. No.: 14/904,853

(22) PCT Filed: Jul. 14, 2014

(86) PCT No.: PCT/US2014/046524
§ 371 (c)(1),
(2) Date: Jan. 13, 2016

(87) PCT Pub. No.: WO2015/009620
PCT Pub. Date: Jan. 22, 2015

(65) Prior Publication Data
US 2016/0224662 A1    Aug. 4, 2016

Related U.S. Application Data

(60) Provisional application No. 61/847,362, filed on Jul. 17, 2013.

(51) Int. Cl.
*G06F 17/30* (2006.01)
*G06N 99/00* (2019.01)

(52) U.S. Cl.
CPC .. *G06F 17/30675* (2013.01); *G06F 17/30637* (2013.01); *G06F 17/30705* (2013.01); *G06F 17/30864* (2013.01); *G06N 99/005* (2013.01)

(58) Field of Classification Search
CPC ........ G06F 17/30675; G06F 17/30637; G06F 17/30705; G06F 17/30864; G06N 99/005
See application file for complete search history.

(56) References Cited

U.S. PATENT DOCUMENTS

| | | | | |
|---|---|---|---|---|
| 7,536,413 B1* | 5/2009 | Mohan | ................ | G06F 17/3071 |
| 9,613,135 B2* | 4/2017 | Subasic | ............... | G06F 17/3071 |
| 2005/0278321 A1* | 12/2005 | Vailaya | ............. | G06F 17/30864 |

* cited by examiner

*Primary Examiner* — Alexander Khong
(74) *Attorney, Agent, or Firm* — Morgan, Lewis & Bockius LLP

(57) ABSTRACT

In various embodiments, documents are searched and retrieved via receipt of a search query, electronically identifying a reference set of relevant documents, providing a search set of documents, creating a database comprising at least some of the documents of the search set and the reference set, computationally classifying the documents in the database, extracting keywords from the search set and one or more classified sets, optionally filtering the extracted keywords, and electronically identifying at least some of the documents from the database that contain one or more of the extracted keywords.

18 Claims, 17 Drawing Sheets

| Cluster 1 (n = 84) | Cluster 2 (n = 283) |
|---|---|
| supreme | inform |
| court | manage |
| consitutional | develop |
| obama | medicine |
| mandate | intern |
| law | help |
| uphold | learn |
| president | train |
| republican | experiment |
| congress | study |
| roberts | resource |
| senate | city |
| repeal | industries |
| insurance | operate |
| tax | hospital |
| rule | build |
| justice | time |
| afford | food |
| decision | clinic |
| penalty | receive |
| unconstitutional | medical |
| hill | profession |
| act | research |
| clause | during |
| commerce | data |

FIG. 3

| Cluster 1 (n = 492) | Cluster 2 (n = 688) | Cluster 7 (n = 1,599) | Cluster 8 (n = 3,091) |
|---|---|---|---|
| lolita | fuck | snimila | que |
| bbs | lolita | fotomodel | por |
| fuck | hot | postala | con |
| hot | love | modny | los |
| preteen | pussy | yorku | para |
| nude | teen | pokopali | una |
| teen | nude | pogreba | las |
| porn | girl | etala | como |
| girl | loli | sobu | pero |
| pussy | porn | petra | del |
| model | preteen | glorijuvideo | todo |
| loli | pic | dobio | este |
| love | model | ubijenog | eso |
| free | gallery | ubili | cuando |
| sex | free | milijune | ser |
| pic | cock | jetiji | porque |
| young | sex | sovjetske | esta |
| russian | bbs | ekspedicije | cosa |
| gallery | russian | tajnolasersko | mucho |
| cock | ass | procvatu | nada |
| ass | sexy | sanade | otro |
| tit | young | nagradu | tiene |
| sexy | nice | znanstvenici | uno |
| underage | cum | nedavno | bien |
| dick | great | glavnu | muy |

FIG. 4

| Cluster 1 (n = 3,578) | Cluster 2 (n = 6,077) |
|---|---|
| suspect | game |
| police | red |
| people | sox |
| fbi | sox & red |
| say | celtics |
| suspect & marathon | bruins |
| report | fan |
| say | new |
| terror | tonight |
| tsarnaev & suspect | los |
| police & suspect | back |
| investigate | que |
| news | come |
| arrest | win |
| fbi & suspect | por |
| attack | york |
| tsarnaev | play |
| why | del |
| kill | chicago |
| muslim | love |
| obama | new & york |
| cnn | see |
| #bostonmarathon | #mlb |
| dzhokhar | team |
| terrorist | series |
| ⋮ | ⋮ |
| #prayforboston | #jobs |
| #tcot | college |
| #benghazi | kevin |

FIG. 5

| Cluster 1 (n = 271) | | Cluster 2 (n = 938) | |
|---|---|---|---|
| 王立军 | (Wang Lijun) | 上海 | (Shanghai) |
| 政治 | (government) | 深圳 | (Shenzhen) |
| 事件 | (incident) | 杭州 | (Hangzhou) |
| 市委 | (municipal committee) | 长沙 | (Changsha) |
| 人民 | (the people) | 武汉 | (Wuhan) |
| 打黑 | (strike corruption) | 中心 | (center) |
| 利益 | (to benefit) | 从事 | (undertake) |
| 犯罪 | (commit a crime) | 文学 | (culture) |
| 民主 | (democracy) | 南京 | (Nanjing) |
| 权力 | (power) | 湖北 | (Hubei) |
| 文革 | (Cultural Revolution) | 苏州 | (Suzhou) |
| 领导 | (leader) | 无锡 | (Wuxi) |
| 改革 | (reform) | 西安 | (Xian) |
| 群众 | (the masses) | 专用 | (special) |
| 中央中共 | (Central Communist Party) | 商品 | (product) |
| 社会主义 | (socialism) | 品牌 | (brand name) |
| 唱红 | (sing red songs) | 山东 | (Shandong) |
| 黑社会 | (black society) | 郑州 | (Zhengzhou) |
| 干部 | (cadre) | 广东 | (Guangdong) |
| 市政府 | (city government) | 妈妈 | (mother) |
| 路线 | (party line) | 陕西 | (Shanxi) |

FIG. 6

| Cluster 1 (n = 3,188) | Cluster 2 (n = 3,800) |
|---|---|
| evaluate | year |
| accuracy | one |
| merge | first |
| stall | two |
| mini | time |
| mall | because |
| password | said |
| suspense | last |
| rick | since |
| taste | also |
| leak | week |
| specialist | come |
| size | think |
| length | people |
| verification | govern |
| pocket | concern |
| shoe | report |
| birth | start |
| android | before |
| gender | nation |
| instruct | back |
| stolen | past |
| joseph | continue |
| chat | would |
| hotel | gold |

FIG. 7

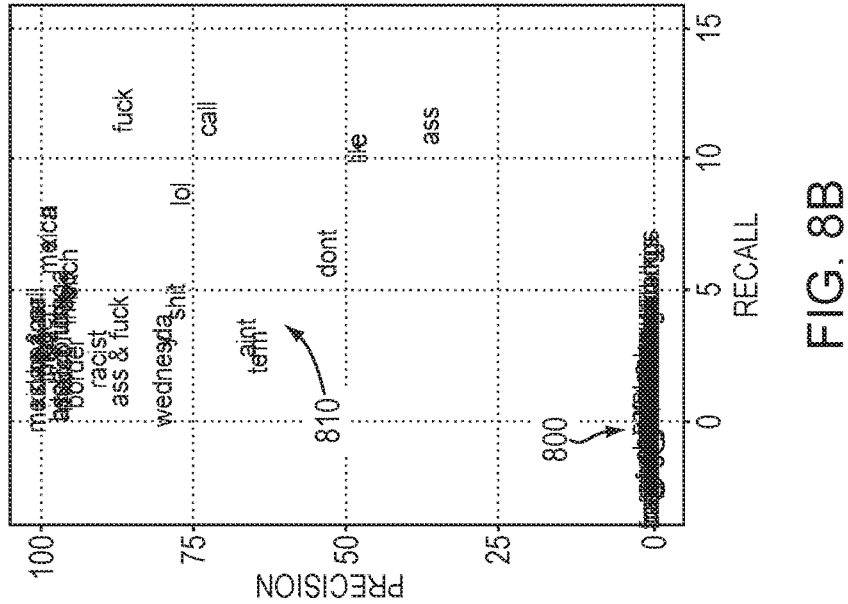

| Cluster 1 (n = 3,183) | Cluster 2 (n = 11,806) |
|---|---|
| fuck | #sfbatkid |
| ass | chic |
| call | geek |
| mexican | #bostonbombings |
| lol | geek & chic |
| bitch | #madiba |
| nigga | suspect |
| lmao | city & #sfbatkid |
| beaner | @sfwish & #sfbatkid |
| shit | save & #sfbatkid |
| nigger | san & #sfbatkid |
| like | @sfwish |
| aint | boston & #bostonbombings |
| dont | gotham & #sfbatkid |
| lmfao | save |
| racist | batkid & #sfbatkid |
| bitch & fuck | make & #sfbatkid |
| mexico | francisco & san & #sfbatkid |
| ass & fuck | francisco & #sfbatkid |
| ass & bitch | day & #sfbatkid |
| slur | geek & look |
| border | chic & look |
| term & bitch | geek & chic & look |
| wednesday | francisco & san |

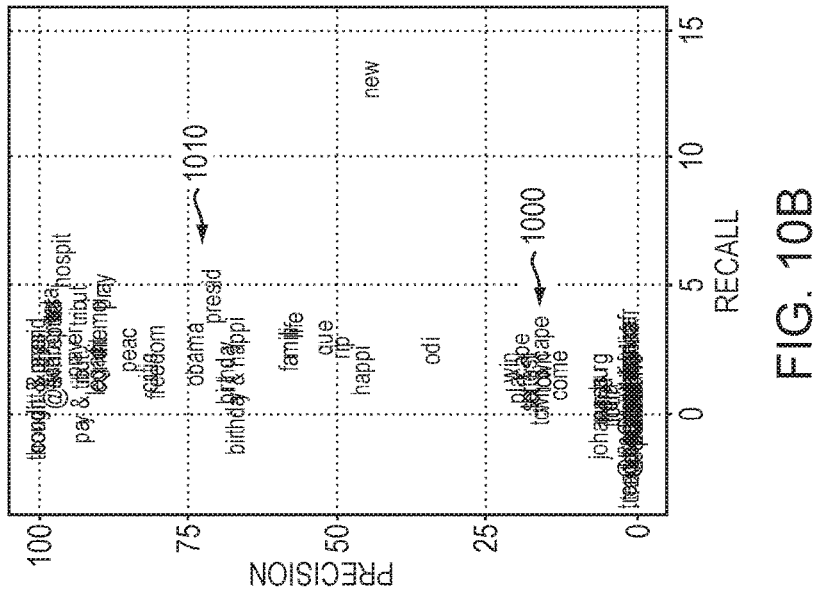

| Cluster 1 (n = 5,046) | Cluster 2 (n = 8,743) |
|---|---|
| tribute | trend |
| prayer | cape |
| president | town |
| family | town & cape |
| birthday | come |
| hospitalized | @trendssthafrica |
| tata | trend & @trendssthafrica |
| freedom | pakistan |
| pray | new |
| birthday & happy | test |
| que | india |
| happy | tour |
| life | australia |
| critical | run |
| condition | win |
| peace | zealand |
| @ewnreport | zealand & new |
| rip | johannesburg |
| memory | odis |
| #sabcnews | lol |
| thought & prayer | trendssthafrica |
| obama | trend & trendssthafrica |
| legacy | series |
| pay & tribute | #cricket |
| condition & president | play |

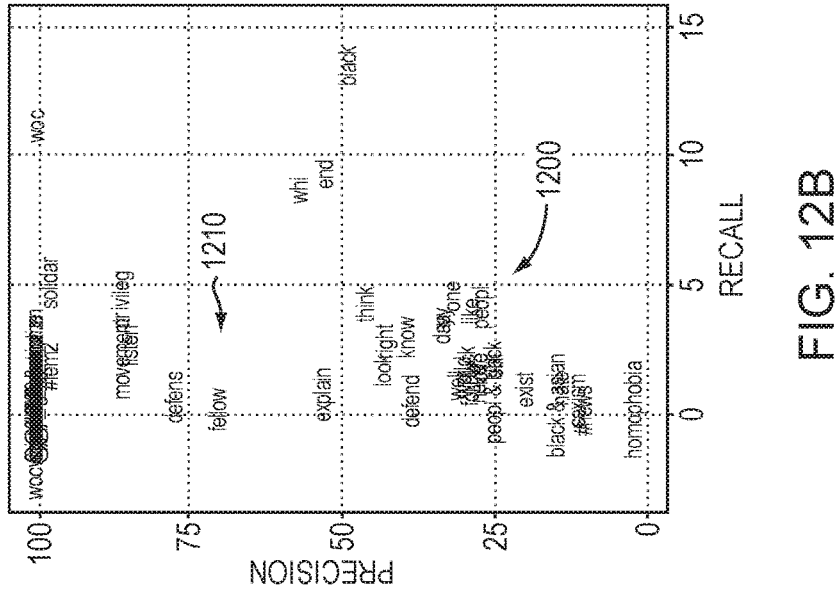

| Cluster 1 (n = 4,820) | Cluster 2 (n = 10,828) |
|---|---|
| woc | people |
| privilege | black |
| listen | think |
| @just_wizz_wizz | one |
| movement | like |
| woc & listen | love |
| #fem2 | day |
| need & woc | know |
| support & woc | say |
| woc & get | still |
| defend | never |
| privilege & woc | people & black |
| yet & woc | end |
| defensive | follow |
| racist & woc | fuck |
| woc & @just_wizz_wizz | well |
| try & woc | exist |
| call & woc | why |
| woc & women | hate |
| explain | world |
| fellow | right |
| woc & movement | homophobia |
| #news | black & asian |
| solidarity | sexism |
| silence & woc | look |

| Target set | 1% | 10% | 25% | 50% |
|---|---|---|---|---|
| Keywords | president<br>family<br>die<br>zuma<br>birthday<br>obama<br>pray<br>freedom<br>long<br>follow<br>memories<br>wish<br>man<br>celebrate<br>remember<br>continue<br>leader<br>life<br>inspire<br>heart<br>media<br>arrive<br>state<br>very<br>never | president<br>tribute<br>zuma<br>birthday<br>hospital<br>pray<br>obama<br>freedom<br>family<br>die<br>inspire<br>prayer<br>never<br>birthday & happy<br>@ewnreporter<br>critical<br>happy<br>@encanews<br>peaceful<br>tata<br>#sabcnews<br>legacy<br>bless<br>bieber<br>lie | hospital<br>tribute<br>president<br>birthday<br>tata<br>prayer<br>pray<br>freedom<br>critical<br>inspire<br>birthday & happy<br>remain<br>condition<br>peaceful<br>#sabcnews<br>jacob<br>happy<br>family<br>bless<br>thought<br>jacob & zuma<br>man<br>rest<br>que<br>@chriseidalewis | birthday<br>family<br>birthday & happy<br>president<br>happy<br>condition<br>tribute<br>que<br>tata<br>critical<br>bless<br>por<br>inspire<br>follow<br>thought<br>los<br>condition<br>pour<br>#obama<br>condition & president<br>condition & critical<br>obama<br>soon & get<br>well & soon<br>rest |
| Recall | 84 | 75.4 | 66.48 | 55.76 |
| Precision | 2.79 | 23.34 | 46.45 | 68.13 |
| Cluster n | 1,506 | 1,615 | 1,789 | 2,046 |

SYSTEMS AND METHODS FOR KEYWORD DETERMINATION AND DOCUMENT CLASSIFICATION FROM UNSTRUCTURED TEXT

RELATED APPLICATION

This application claims the benefit of and priority to U.S. Provisional Patent Application No. 61/847,362, filed Jul. 17, 2013, the entire disclosure of which is hereby incorporated herein by reference.

TECHNICAL FIELD

In various embodiments, the present invention relates to text analysis, in particular to computer-assisted text analysis combining training classifiers and user input.

BACKGROUND

Many approaches to automated text analysis require a set of keywords which, by applying Boolean matching rules to a large text corpus, define a set of documents for further study (as in search or e-discovery), counting (for sentiment and topic analysis), or as a first step in most sophisticated approaches to automated text analysis. In most areas, users choose these keywords and document sets by hand. In some applications, mostly involving search and advertising, methods exist to suggest new keywords based on analyzing structured databases, such as from weblogs, meta-tags, or search queries. However, such approaches generally require pre-structured databases that necessarily limit the scope of new keywords and directions of further analysis because of their reliance on the original keywords utilized to structure the data. Thus, these approaches are often unreliable or provide incomplete information when utilized with rapidly evolving bodies of text or discussions. In addition, they involve the time and complexity required to produce the structured data from which new keywords are developed. While some existing techniques mine keywords directly from textual sources, these techniques are quite limited and are typically based on looking up keywords in a thesaurus to generate new keywords.

In view of the foregoing, there is a need for systems and methods for analyzing text by extracting keywords from a larger range of information in unstructured data.

SUMMARY

Various embodiments of the present invention involve computer-assisted statistical approaches that can mine a broad range of information from unstructured corpora (i.e., bodies of text such as collections of documents), without needing any structured data as inputs. In addition to not requiring structured data, embodiments of the present invention do not require look-up tables such as thesauri and have the ability to mine meaningful keywords (i.e., keywords reflecting the relevant concept) from text that doesn't contain any examples of the keywords that have already been selected. Thus, embodiments of the invention may be utilized to not only supplement keyword suggestions from existing text-analysis techniques but also to enable new areas of application, such as following social media conversations that rapidly innovate language to evade censors, seek political advantage, or express creativity; and new areas of search, such as finding a set of all documents reflecting a concept, rather than only the one or few of interest. Various embodiments also improve existing techniques of automated text analysis and include methods of keyword suggestion that use a much wider range of information in unstructured textual data, selected on the fly by the user, and which do not require any type of structured data.

Embodiments of the present invention improve upon methods for the analysis of structured data, such as "query expansion" methods, which include algorithms that add or reweight keywords within search queries in order to retrieve a more representative set of documents. Various embodiments of the invention differentiate themselves from query expansion methods in multiple ways. First, most query expansion methods retrieve new keywords either by stemming the original keyword, applying synonyms to the original keyword, or finding related terms within the corpus defined by the original keyword. In contrast, embodiments of the present invention locate related keywords in external corpora that do not include the original keyword. Rather, embodiments of the invention utilize the user's expertise to define a "search dataset" and "reference dataset" from which new related keywords are generated. Second, query expansion methods often try to limit "topic drift," or avoid identifying keywords that are too general. Embodiments of the invention determine both general and specific keywords and may address topic drift as a subject for study rather than a problem to be avoided or prevented. Embodiments may utilize user input to refine keyword suggestions and provide relevant data sets even in the face of topic drift. Third, most query expansion methods rely on probabilistic models of lexical properties of text. In contrast, embodiments of the invention utilize ensembles of document classifiers to initially group documents that may be of interest to the user. Embodiments then retrieve keywords that are likely to appear in these document groups, but unlikely to appear in the rest of the search dataset.

In an aspect, embodiments of the invention feature a computer-implemented method of document searching and retrieval in a corpus of documents stored in a database. A search query (1) including or consisting essentially of at least one reference keyword and (2) pertaining to a pre-determined concept is received via a communications interface. A reference set of query-responsive documents each relevant to the pre-determined concept and containing text matching the at least one reference keyword is electronically identified in response to the search query. An electronically stored search set of documents is provided. Each of the documents in the search set is not within the reference set, and one or more of the documents in the search set are relevant to the pre-determined concept. An electronically stored database of documents, including or consisting essentially of at least some of the documents from the reference set and at least some of the documents from the search set, is created. At least some of the documents in the database are computationally classified, by a computer processor and without utilizing the at least one reference keyword. The documents may be classified into one of first and/or second classified sets. Documents in the first classified set are predicted to be relevant to the pre-determined concept and include documents from the reference set and the search set, and documents in the second classified set are predicted not to be relevant to the pre-determined concept and include documents from the search set. In some embodiments, at least some of the documents are computationally classified into a first classified set to identify documents predicted to be relevant to the pre-determined concept and comprising documents from the reference set and the search set. One or more keywords are computationally extracted, by the computer processor, from documents in the search set and/or the first classified set. Each keyword is (1) predicted to be relevant to the pre-determined concept and (2) different from the at least one reference keyword. The extracted keywords are optionally filtered. At least some of the documents from the database are electronically identified (1) in response to the search query, (2) via a communications interface, (3) in addition to the electronically identified reference set of documents, and (4) that contain one or more of the extracted keywords.

Embodiments of the invention may include one or more of the following in any of a variety of combinations. The extracted keywords may be filtered by (i) displaying one or more of the extracted keywords on a display, and receiving over a communications interface one or more inputs from a user each indicating (1) relevance of one or more extracted keywords or (2) irrelevance of one or more extracted keywords, (ii) for each extracted keyword indicated as relevant, (1) designating the extracted keyword as a reference keyword and (2) adding documents associated therewith to the reference set of documents, and (iii) for each extracted keyword indicated as irrelevant, removing documents associated therewith from the search set of documents. One or more documents associated with at least extracted keyword may be displayed on the display. The extracted keywords may be filtered by displaying one or more of the extracted keywords on a display, and receiving over a communications interface one or more inputs from a user each indicating relevance of one or more extracted keywords. One or more, or even all, of the steps of the method may be repeated utilizing the one or more extracted keywords indicated as relevant as reference keywords. One or more of the documents from the reference set and/or from the database may be displayed on a display. Classifying the documents in the database may include or consist essentially of executing with the computer processor a plurality of classifiers each utilizing one or more predictors each including or consisting essentially of text from the documents different from the at least one reference keyword. The second classified set may not include documents from the reference set. The second classified set may include documents from the reference set. Extracting one or more keywords may include or consist essentially of selecting at least one keyword having a frequency of occurrence in documents within both the search set and the first classified set larger than a frequency of occurrence in documents within both the search set and the second classified set. Classifying the documents in the database may include or consist essentially of computationally clustering at least some of the documents into partitions each intended to approximate a different interpretation of the pre-determined concept. One or more keywords may be extracted for each partition of documents. One or more keywords may be extracted for only one partition of documents or for multiple partitions of documents. Keywords may be filtered for only one partition of documents or for multiple partitions of documents. Documents containing the one or more extracted keywords may be identified for only one partition of documents or for multiple partitions of documents.

In another aspect, embodiments of the invention feature a system for document searching and retrieval that includes or consists essentially of an electronically stored database of documents, an electronically stored database of reference keywords, a computer processor, a classification module, an extraction module, and a results module. The database of documents includes or consists essentially of one or more documents from each of (a) an electronically stored reference set of documents each pertaining to a pre-determined concept and containing text matching at least one reference keyword, and (b) an electronically stored search set of documents, where (i) each of the documents in the search set is not within the reference set and (ii) one or more of the documents in the search set are relevant to the pre-determined concept. The database of reference keywords includes or consists essentially of stored computer records specifying, for each reference keyword, documents in the reference set of documents containing text matching the reference keyword. The classification module is executable by the computer processor and configured to classify, without utilizing the at least one reference keyword, documents in the database of documents into at least one of first or second classified sets. Documents in the first classified set are predicted to be relevant to the pre-determined concept and include or consist essentially of documents from the reference set and the search set, and documents in the second classified set are predicted not to be relevant to the pre-determined concept and include or consist essentially of documents from the search set. The extraction module is executable by the computer processor and configured to extract keywords each (i) predicted to be relevant to the pre-determined concept, (ii) not present in the database of reference keywords, and (iii) associated with one or more documents in the database of documents. The results module is executable by the computer processor and configured to identify at least some of the documents from the database of documents, in response to a search query, that contain one or more of the extracted keywords.

Embodiments of the invention may include one or more of the following in any of a variety of combinations. The results module may be configured to display (i) one or more extracted keywords, (ii) one or more documents associated with an extracted keyword, and/or (iii) one or more documents in the reference set of documents. The system may include a communications interface for (i) accepting search queries and/or (ii) accepting user input indicating relevance or irrelevance of extracted keywords.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, a "keyword" is all or a portion of a Boolean search string, i.e., one or more words used as reference points for finding other words or information, and/or that indicate content and/or relevance of a document, which may be linked by one or more Boolean operators (e.g., AND or NOT, which may thus be parts of "keywords" as used herein). As used herein, the terms "approximately" and "substantially" mean±10%, and in some embodiments, ±5%. The term "consists essentially of" means excluding other materials that contribute to function, unless otherwise defined herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 3 depicts keywords from each of two clusters of documents identified in accordance with embodiments of the present invention;

FIG. 4 depicts keywords from each of four clusters of documents identified in accordance with embodiments of the present invention;

FIG. 5 depicts keywords from each of two clusters of documents identified in accordance with embodiments of the present invention;

FIG. 6 depicts keywords from each of two clusters of documents identified in accordance with embodiments of the present invention;

FIG. 7 depicts keywords from each of two clusters of documents identified in accordance with embodiments of the present invention;

FIG. 8A depicts keywords from each of two clusters of documents identified in accordance with embodiments of the present invention;

FIG. 8B graphically presents the keywords of FIG. 8A for evaluation based on precision and recall metrics in accordance with embodiments of the present invention;

FIG. 10A depicts keywords from each of two clusters of documents identified in accordance with embodiments of the present invention;

FIG. 10B graphically presents the keywords of FIG. 10A for evaluation based on precision and recall metrics in accordance with embodiments of the present invention;

FIG. 12A depicts keywords from each of two clusters of documents identified in accordance with embodiments of the present invention;

FIG. 12B graphically presents the keywords of FIG. 12A for evaluation based on precision and recall metrics in accordance with embodiments of the present invention;

FIG. 15 presents precision and recall results demonstrating robustness of embodiments of the present invention to mislabeled training data; and FIGS. 16A and 16B are word clouds depicting keywords suggested by human respondents in a comparative example not utilizing embodiments of the present invention.

DETAILED DESCRIPTION

Figure 1:
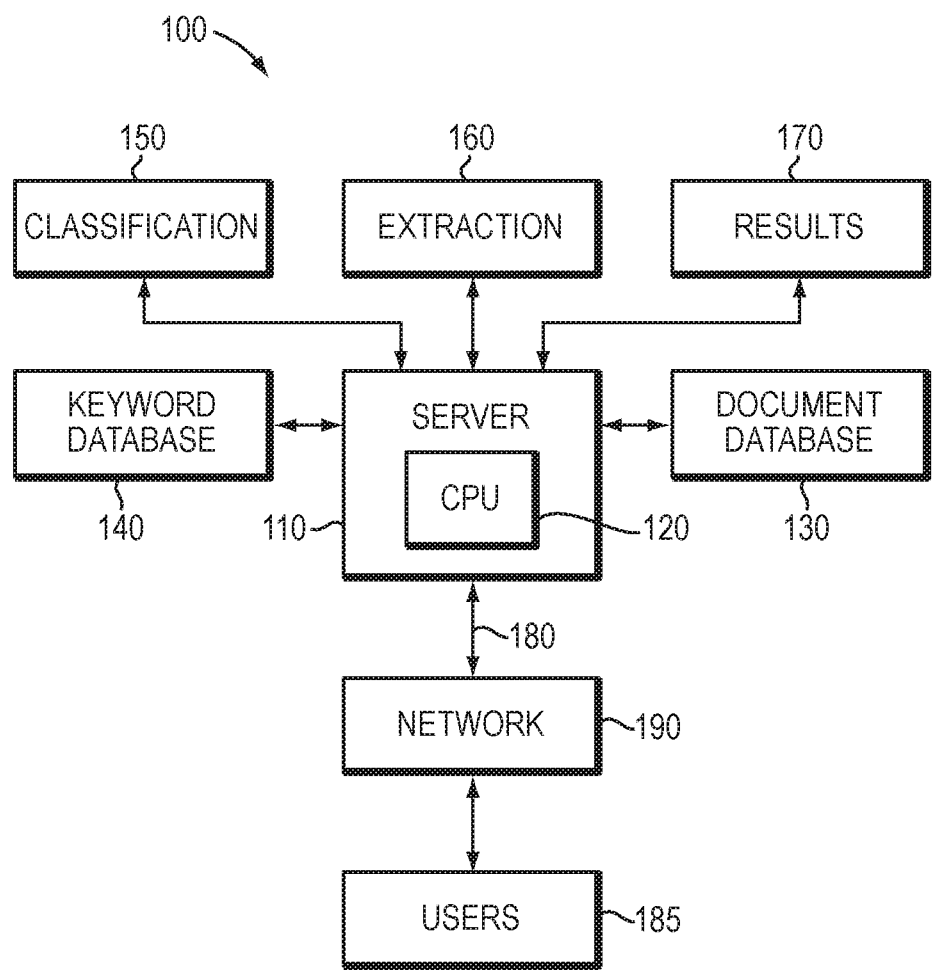
FIG. 1 is a block diagram of a system for document searching and retrieval in accordance with various embodiments of the present invention.

The computer-assisted, iterative technique utilized in various embodiments of the present invention refines results based on mistakes made by automated classifiers as well as the decisions of users in interacting with the system. In applications, embodiments of the invention regularly produce lists of keywords that are intuitive as well as keywords that would have been unlikely to have been produced by a user working by hand. Embodiments of the invention produce keywords, and associated document sets, by mining unstructured text, at times with input from the user, without requiring structured data. As is well known, keywords in a query can be employed in a search according to Boolean logic rules. These rules may be explicitly provided by the user in formulating a query, and typically, if no Boolean operators are supplied, a search engine will apply default rules. For example, a search engine might interpret the query "Harvard University" as "Harvard AND University" absent a contrary Boolean operator (such as "Harvard OR University"). Accordingly, the keywords produced in accordance herewith are typically used, in a search, according to Boolean operators explicitly provided in the query or implicitly applied by the search program.

Thus, various embodiments of the present invention expand a set of documents (the "reference set") that pertain to a particular concept with additional documents from a larger corpus (the "search set") that contains one or more documents relevant to the concept but also documents irrelevant to the concept. In an exemplary embodiment, the reference set R is a set of documents that each contains text that matches a set of chosen keywords (which may include chosen Boolean operators) KR. The reference set is intended to be defined narrowly so that it only includes documents about a single chosen concept (topic, sentiment, etc.), such that the probability of documents being included that do not represent this concept are negligible with respect to the application at hand. The search set S is another set of documents that does not overlap the reference set (i.e., none of which contain text with matches for KR), and some of which may be about the concept. The search set may be defined by a broader set of keywords, a convenience sample, all available documents, or the entire Internet. Embodiments of the invention identify a "target set," a subset of documents from the search set that reflects the same concept that defines the documents in the reference set. Equivalently, embodiments of the invention thus identify a set of keywords (which may include Boolean operators) KS that define the target set. Embodiments of the invention analyze R, S, and KR and output KS, along with the associated search target set.

To identify the target set and associated keywords, embodiments of the invention utilized computer-assisted (i.e., human-empowered) techniques, rather than fully automated ones. The reason for this choice is that the "concept" which all the documents in the reference set share, and for which a target set is sought, is not a well-defined mathematical entity. Human language and conceptual definitions are rarely so unambiguous. Indeed, any two non-identical documents could be regarded as the same (they are both documents), completely unrelated (since whatever difference they have may be crucial), or anything in between. Only additional information about the context (available to a person but not available solely from the data set) may informatively resolve this indeterminacy. To take a simple example, suppose a reference set is defined by the keyword "sandy". Should the target set include documents related to a storm that devastated the New Jersey shoreline, a congresswoman from Florida, a congressman from Michigan, a cookie made with chopped pecans, a type of beach, a hair color, a five letter word, or something else? Of course, a user may always define the reference set more precisely to avoid this problem, but the nature of language means that some ambiguity will always remain. Thus, embodiments of the invention utilize human input, with information from the text presented to the human user in a manner that is easily and quickly understood, to break this indeterminacy and grow the reference set in the desired direction.

Thus embodiments of the present invention define the reference set R, the associated keywords and Boolean operators KR, and the search set S. The search set may be defined as a preexisting set (e.g., all web sites, or all press releases) or by subsetting via a set of keywords that culls documents from a larger set. For example, users may optionally pre-process textual documents in a larger set to produce the search set by, e.g., changing all letters to lowercase, removing punctuation, removing numbers or special characters, removing stop words, stemming words, or removing short words that consist of fewer than three letters. Next, a "training" set is defined from subsets of S and R. The subsets may be chosen at random, although for some applications the subsets may be "exemplars" that best represent documents within the chosen set. In some embodiments of the invention, the training set definition step is repeated with different random subsettings to increase the diversity of keyword candidates.

After defining the training set, one or more document classifiers are typically fitted to the training data to try to predict membership in S or R, using as predictors any element of the text of the documents (other than their deterministic definitions, KR and KS). Any set of statistical, machine learning, or data analytic classifiers may be used, but preferred embodiments utilize as large a set as is convenient and computationally feasible.

Next, the classifiers estimated in the training set are utilized to estimate the probability of each document in the search set falling into either R or S. Of course, all the search set documents in fact fall within S, but embodiments of the invention learn from the mistakes the classifiers make. Although the probabilities need not be transformed into discrete classification decisions for subsequent steps, an exemplary transformation is provided for clarity. Table 1 portrays the results for one example classifier, with the originally defined truth in rows and potential classifier decisions in columns. In Table, 1, {a|b} is the set of documents in set b classified into set a, S is the search set, and R is the reference set. For example, {R|S} is the set of search documents classified into the reference set.

TABLE 1

|       |           | Classified |        |
|-------|-----------|------------|--------|
|       |           | Search     | Reference |
| Truth | Search    | {S|S}      | {R|S}  |
|       | Reference | {S|R}      | {R|R}  |

In particular embodiments of the invention, the user will typically be interested in documents from the search set that have been classified (or, more accurately, misclassified) into the reference set, {R|S}. Embodiments of the invention exploit these misclassifications (or "mistakes") since documents in this set will have some similarities to the reference set (even though they are in fact in the search set), and so likely contain new keywords that may be harvested to better represent the concept of interest. For other applications, the other groups defined by the classifier in Table 1 may also be useful. For example, the documents in set {S|S} are in the search group and classified to the search group, and such documents may be useful for identifying keywords to avoid when defining a topic of interest. Similarly, the documents in set {R|R} may contain alternative keywords that define documents within the reference set. These keywords may be used in the next iteration as keywords to define the search dataset, or might be specific enough to be used to expand the reference set directly.

Embodiments of the invention utilize the continuous probability of being in each of the classes in Table 1, such as $p_{c,d}(R|S)$, for classifier c and document d. For increased speed, embodiments of the invention approximate the continuous probability and parallelize the classification step. After defining S and R, a small number of documents from S and R respectively may be randomly sampled. This sampling may be repeated many times in parallel. Each parallel process may perform the above-described steps by designating a training set from the S and R samples and running the classifiers to get $p_{c,d}(R|S)$ for each S document in each parallel run. Across M parallel runs, any particular document in S may be sampled between 0 and M times. For each document in S sampled at least once in the parallel runs, C averaged probabilities may be calculated, one for each classifier, by taking the average probability $p_{c,d}(R|S)$ over the parallel runs, where each averaged probability is an average across anywhere from 1 to M values depending on how often an S document is sampled in the parallel runs. The steps described below may then be performed using the average probabilities.

Different classifiers may pick up on different features of the data and thus may be used to represent different concepts, some of which a user may wish to choose. Thus, documents may be grouped based on similarity with respect to the set of potentially diverse opinions expressed by the set of classifiers about the probability of (for example) a search document being in the reference set. For example, suppose one of the keywords defining the reference set KR is "black." This may mean that the user interested in a color, an ethnic group, a comedian (Lewis Black), a way to prepare coffee, or a great ski run. To make the determination, embodiments of the invention use human input and represent this diversity of information in a manner that may make it easier for the user, as summarized as follows. Denote by $p_{c,d}(R|S)$ the probability that document d from the search set is estimated to be in the reference set, according to classifier c. If it were to be assumed that all the classifiers tapped the same underlying concept defining the reference set, then $p_{c,d}(R|S)$ might be averaged over classifiers for each document (i.e., assuming that they differ only due to random chance) and then keywords might be mined from the set of documents with the highest probabilities. Instead, embodiments of the present invention use the diverse "opinions" about what documents should be in the reference set offered by a diverse set of classifiers to help characterize the different concepts that the same keywords defining the reference set may represent.

Thus, embodiments of the invention first summarize each document d with the set of classifier opinions about it:

$$p_{\cdot,d}(R|S) = \{p_{1,d}(R|S), \ldots, p_{C,d}(R|S)\}$$

Then, a clustering method is utilized to partition the documents, with each partition intending to approximate a different concept or meaning of KR. Embodiments of the invention may utilized any of a number of existing clustering methods as known to those of skill in the art. On exemplary embodiment of the invention utilizes the "partition around medoids" algorithm ("pam") and its large data sampling counterpart CLARA (Clustering LARge Applications), as described in Finding Groups in Data: An Introduction to Cluster Analysis, by Leonard Kaufman and Peter Rousseeuw, New York: Wiley (1990), the entire disclosure of which is incorporated by reference herein. The user may specify the number of medoids to return different numbers of sets of keywords, or he or she may run multiple fully automated clustering algorithms or one or more computer-assisted versions as described in Grimmer, Justin and Gary King. 2011, "General purpose computer-assisted clustering and conceptualization," Proceedings of the National Academy of Sciences 108(7):2643-2650, U.S. Pat. No. 8,438,162, filed on Apr. 12, 2010, and International PCT Publication No. WO 2012/102990, filed Jan. 23, 2012, the entire disclosure of each of which is incorporated by reference herein. Other embodiments of the invention utilize other clustering techniques.

Embodiments of the invention then extract keywords (and/or more general Boolean operators) that characterize (and would help distinguish) each of the clusters created of search set documents. Keywords provide a simple and concise definition of candidate target sets. Although humans are typically not good at selecting them all on their own, individual keywords are easily understandable and the set of keywords are easily improvable by human users. Each of the clusters of documents within the search set created as detailed above may serve as a candidate for the target set {R|S}. Thus, embodiments of the invention at this point benefit from human input, which typically requires that each cluster be presented in an easily and quickly understandable manner. In fact, even if one of these clusters clearly belongs in the target set, the user might have a difficult time ascertaining this fact by having access to only a large set of documents too numerous to read.

Thus, embodiments of the invention summarize each cluster by a simple set of keywords so that it easier to understand (and of course for some purposes, the goal is the keywords themselves). To do this, documents are optimally classified into these given clusters subject to the constraint of keyword-based classification. Even if the keywords do not perfectly represent the cluster, they will often be close and, regardless, being able to receive human input at this stage is often well worth the compromise. Moreover, the fact that the keywords are understandable by the human user means, unlike most statistical or machine learning classifiers, that the user may tweak the keywords to continuously improve the classification if desired.

To construct a keyword-based classifier, embodiments of the invention may utilize techniques described in Chidanand Apte, Fred Damerau, and Sholom M. Weiss, "Automated Learning of Decision Rules for Text Categorization," ACM Transactions on Information Systems, 12(3):233-251 (1993); William W. Cohen, "Learning Rules that Classify E-Mail," in AAAI Spring Symposium on Machine Learning in Information Access (1996); and William W. Cohen and Yoram Singer, "Context-Sensitive Learning Methods for Text Categorization," ACM Transactions on Information Systems 17(2):141-173 (1999), the entire disclosure of each of which is incorporated by reference herein. One particular embodiment of the invention utilizes techniques similar to those described in Benjamin Letham, Cynthia Rudin, Tyler H McCormick, and David Madigan, "Interpretable Classifiers Using Rules and Bayesian Analysis: Building a Better Stroke Prediction Model," (2013), based on Bayesian List Machines (BLM), the entire disclosure of which is incorporated by reference herein.

For clarity, one cluster of interest is designated for this particular discussion as {R|S}, and the union of all documents in all other clusters is denoted as the set {S|S}. (This may be ultimately repeated for each cluster of interest.) Then, for document d in search set S, let $y_d=1$ if $d \in \{R|S\}$ and $y_d=0$ if $d \in \{S|S\}$. Thus, embodiments of the invention perform a discrete optimization, identifying the set of keywords that best distinguish documents in {R|S} from documents in {S|S}. Then, denote a keyword decision rule r (or Boolean search string) in the format:

$$\text{foo} \rightarrow \{R|S\}$$

where "foo" is a chosen keyword and the notation indicates that "foo" selects the set {R|S} because documents in this set contain the keyword "foo" with higher frequency than documents in the set {S|S}. Decision rules may also be much more complicated than a single keyword, including any Boolean search string. Three exemplary types of decision rules may be utilized in embodiments of the invention:

1. single keywords: "foo"→{R|S}
2. AND statements: "foo" & "bar"→{R|S}
3. NOT statements: NOT "foobar"→{R|S}

Single keywords are words (or word stems) prevalent in {R|S} but not {S|S}. "AND statements" are combinations of single keywords prevalent in {R|S} but not {S|S}. (Note that the traditional n-grams are simply subsets of AND statements that identify the string of words together.) "NOT statements" are single (or multiple if combined with AND statements) keywords that are prevalent in {S|S} but not {R|S}.

One possible embodiments of the invention would be to list every possible Boolean search string, quantify how well each does in the task of discriminating {R|S} from {S|S}, and then choose the best one. Thus, to generate a set of decision rules for {R|S}, embodiments of the invention would need a method to generate a list of possible keyword combinations on the left-hand side of the decision rule and a metric to rank the performance of the rules in characterizing the {R|S}. However, depending upon the number of keywords, enumerating all empirical keyword combinations may be infeasible in some embodiments of the invention. Fortunately, various embodiments need only identify keyword combinations that occur frequently either within {R|S} or {S|S}, which may be accomplished using known techniques of association rule learning. (As known to those of skill in the art, association rule learning algorithms were not originally intended for use with keywords and text mining. In such techniques, document sets as detailed herein are known as the "transactions" and the combinations of keywords play the role of "itemsets".) For example, these properties may be found in the "Apriori algorithm" for frequent item set mining, as described in Rakesh Agrawal and Ramakrishnan Srikant, "Fast Algorithms for Mining Association Rules," Proceedings of the 20th VLDB Conference pp. 487-499 (1994), the entire disclosure of which is incorporated by reference herein, although other techniques may also be utilized in various embodiments of the present invention. The Apriori algorithm allows one to reasonably restrict the number of keyword combinations by (1) increasing the minimum support for keyword combinations within the search set, (2) mining for possible keyword combinations only within given clusters, and (3) setting limits on the number of words (AND statements) allowed in any keyword combination.

Once a set of frequently used keyword combinations is determined, embodiments of the invention produce a metric to rank them by how well they characterize {R|S} relative to {S|S}. Various embodiments may utilize the following data-generating process. For simplicity, the right-hand side of the rule may be dropped, and r is utilized denote any frequent keyword combination within the frequent item set. Then, the vector y is drawn from the Beta-Binomial distribution with Beta parameters αSS and αRS, Binomial parameters θr and θ−r, and counts nr,RS, nr,SS, n−r,RS, and n−r,SS.

To calculate the likelihood, define nr,RS as the number of documents in {R|S} that satisfy rule r (i.e., documents which include the keyword combinations in r) and nr,SS as the number of documents in {S|S} that satisfy rule r. Also, let nr=nr,RS+nr,SS be the total number of documents in S that satisfy rule r. The notation −r denotes the analogous quantities for documents that do not satisfy rule r. Finally, define NRS and NSS to be the total number of documents in each group such that NRS=nr,RS+n−r,RS and NSS=nr,SS+n−r,SS. Then, the likelihood for this model is:

$$L(y_1, \ldots, y_n | \theta^r, \theta^{-r}, r) = \text{Bin}(n_{r,RS}, n_{r,SS} | n_r, \theta^r) \times \text{Bin}(n_{-r,RS}, n_{-r,SS} | n_{-r}, \theta^{-r})$$

where
$\theta^r \sim \text{Beta}(\alpha_{RS}, \alpha_{SS})$
$\theta^{-r} \sim \text{Beta}(\alpha_{RS}, \alpha_{SS})$ In exemplary embodiments of the invention, RS=SS=1, and marginalization is performed over θr and θ−r to obtain:

$$p(y_1, \ldots, y_n | \alpha_{RS}, \alpha_{SS}, r) \propto$$
$$\frac{\Gamma(n_{r,RS} + \alpha_{RS}) \Gamma(n_{r,SS} + \alpha_{SS})}{\Gamma(n_{r,RS} + n_{r,SS} + \alpha_{RS} + \alpha_{SS})} \times \frac{\Gamma(N_{RS} - n_{r,RS} + \alpha_{RS}) \Gamma(N_{SS} - n_{r,SS} + \alpha_{SS})}{\Gamma(N_{RS} - n_{r,RS} + N_{SS} - n_{r,SS} + \alpha_{RS} + \alpha_{SS})}$$

The likelihood for all keyword combinations generated from the Apriori algorithm is then calculated, and they are ranked in order from highest to lowest likelihood. The likelihood receives a higher value when a keyword combination is much more prevalent in one group versus another. However, the likelihood typically does not distinguish whether a keyword combination that characterizes {R|S} well versus one that characterizes {S|S} well. To resolve this issue of non-identification, the decision rules may be oriented to characterize {R|S} (i.e., the right-hand side is always {R|S}). This enables the dropping of the right-hand side of the decision rule and the use "keyword combination" and "rule" interchangeably. Then, for every rule that is more prevalent in {S|S} than {R|S} (as measured by the percentage of each group that contains the rule), the rule is changed into a NOT rule. For example, if the word "foobar" has a high likelihood and occurs in a greater percentage of {S|S} documents than {R|S} documents, then the rule becomes NOT "foobar" in characterizing {R|S}.

Finally, embodiments of the invention use the same set of keyword combinations to characterize each cluster by repeating the same process within each cluster, switching off the definition of the {R|S} set. More specifically, in the keyword combination mining stage, embodiments of the invention run the Apriori algorithm on the entire search set to find all unique of keyword combinations, which are then ranked for each cluster. The only difference across clusters is in the rank ordering of the keyword combinations and whether a keyword combination becomes a NOT rule.

Next, embodiments of the invention present keywords to users organized in sets by similarity and likelihood of their being useful; this step is illustrated in context in the examples provided below. Finally, embodiments of the invention utilize human user feedback by treating keywords surfaced thus far as suggestions, which the user may keep or reject by studying the keywords or some of the documents they select. If a keyword is deemed relevant, it may be used to expand the reference set; concluding that a keyword is not relevant may be used to shrink the search set. As the search and reference sets are updated with knowledge from the user, the above-described steps may be re-run (automatically, in the background), which continuously generates new and improved sets of keywords to offer the user. After interacting with the system in this iterative way, the user may come to a decision that effectively all documents will be found, given the time available, and thus no more keyword searching is necessary.

The keywords generated via embodiments of the present invention may be of interest themselves or they may serve as interpretable aids for retrieving or identifying the target set. In either case, human input is an important aspect.

One place in which human input is utilized is choosing the number of clusters produced by the clustering algorithm. This number may be "estimated," but different numbers of clusters may define different uses, and thus it is often preferred to make the choice ex ante. In practice, it is also easy to repeat embodiments of the invention multiple times with different numbers of clusters to explore the search set and extract keywords. For example, if the application has relatively unambiguous language, one may utilized only two clusters to roughly divide the search set into an approximation of the target set and everything else. In most cases, however, a larger number of clusters leads to more interesting discoveries. If the search set contains many distinct topics, increasing the number of clusters may allow embodiments of the invention to identify some of these topics and the keywords associated with them. Furthermore, since documents in different clusters are likely to be about slightly different topics, different keywords are likely to be prominent in different clusters, so choosing a larger number of clusters allows the user to quickly view more relevant keywords. On the other hand, having too many clusters may result in some clusters without coherent topics or some topics split across multiple clusters.

Once an embodiment of the invention produces a set of ranked keywords for each cluster, the user may examine each directly. For example, if the goal is to produce relevant keywords on the reference topic, monitor conversational drift, or further understand of the search set, then the user may look through the suggested keywords in each cluster, choosing those of interest and adding them to the definition of the reference set, likely by expanding the Boolean search with OR operators.

In producing keywords, embodiments of the present invention mine from the search set to find keywords that may retrieve the target set hidden within it. Embodiments may also mine the reference set directly to find keywords of interest. While embodiments of the invention may be utilized to produce extensions that involve the reference set, preferred embodiments initially mine the search set. For one, the reference set has already been defined by the user with the goal being to find documents within the search set. For another, keywords mined directly from the reference set may perform well only insofar as the documents and words used in the reference set are representative of the target set. In some cases such as conversational drift or intentional language changes to evade authorities, the reference set is unlikely to include the new words of interest. In fact, a key benefit of embodiments of the invention is that the reference set need not be a random or representative sample of the target set. In extensive testing and the examples provided below, embodiments of the invention generally pick up most of the important keywords used in the reference set, but may also find many keywords and keyword combinations that either do not exist in the reference set or keywords that have changed in their importance to the topic relative to the reference set.

Various embodiments of the present invention then extract keywords of likely relevance to the concept of interest. For any group in Table 1 of interest, keywords that uniquely characterize that group may be extracted. To do so, various embodiments of the invention utilize the techniques within particular classifiers, e.g., techniques based on coefficients on n-grams. Embodiments of the invention may also utilize one or more techniques that summarize documents with keywords utilizing, e.g., statistically improbable phrases (SIPs), as well known to those of skill in the art (for example, as described in Turney, Peter D. 2002, "Learning to Extract Keyphrases from Text," CoRR cs.LG/0212013, Frank, Eibe, Gordon W. Paynter, Ian H. Witten, Carl Gutwin, and Craig G, Nevill-Manning, 1999, "Domain-specific keyphrase extraction," Hulth, Anette, 2003, "Improved automatic keyword extraction given more linguistic knowledge," Proceedings of the 2003 Conference on Empirical Methods in Natural Language Processing, Association for Computational Linguistics pp. 216-223, Wan, Xiaojun and Jianguo Xiao, 2008, "Single Document Keyphrase Extraction using Neighborhood Knowledge," Proceedings of AAAI, pp. 855-860, Nguyen, Thuy Dung and MM-Yen Kan, 2007, "Keyphrase Extraction in Scientific Publications," Asian Digital Libraries, Looking Back 10 Years and Forging New Frontiers, Springer pp. 317-326, Lin, Meng-Chun, Ming-Xiang Li, Chih-Chuan Hsu and Shih-Hung Wu, 2010, "Query Expansion fromWikipedia and topicWeb crawler on CLIR," Proceedings of the 8th NTCIR Workshop Meeting on Evaluation of Information Access Technologies: Information Retrieval, Question Answering, and Cross-Lingual Information Access. pp. 101-106, and Kim, Su Nam and Timothy Baldwin, 2012, "Extracting Keywords from Multi-party Live Chats," the entire disclosure of each of which is incorporated by reference herein). As known to those of skill in the art, SIPs are typically keywords that are frequent within the documents of interest (e.g., the reference set) and infrequent in other documents. In that sense, the words discriminate the reference set from the search set well.

A statistic that may be used to identify such keywords is term-frequency, inverse-document frequency (tf-idf). For example, embodiments of the invention may identify keywords that distinguish documents in set $\{R|S\}$ from those in set $\{S|S\}$. In various embodiments, the frequency of each term within the corpus $\{R|S\}$ is determined, as is the inverse document frequency for the corpus $\{S|S\}$, which is the logarithm of the number of documents in $\{S|S\}$ divided by the number of documents in $\{S|S\}$ that contain a particular term:

$$idf(t, \{S|S\}) = \log \frac{|D_{\{S|S\}}|}{|\{d \in \{S|S\} : t \in d\}|}$$

where t is the term count, and $D_{\{S|S\}}$ is the number of documents in the $\{S|S\}$ corpus.

The term frequency may be determined with reference to the number of each term within the corpus $\{R|S\}$:

$$tf(t, \{R|S\}) = |t \in d : d \in \{R|S\}|$$

and then, the tf-idf between the two corpuses may be calculated as:

$$bctfidf(t, d, \{S|S\}, \{R|S\}) = tf(t, d : d \in \{R|S\}) idf(t, \{S|S\}).$$

Embodiments of the invention utilize this "between-corpus tf-idf" (bc-tf-idf). Words with a large value of bc-tf-idf are keywords that distinguish between the two groups of documents. Words that occur with zero frequency in either corpus may be removed to avoid division by zero and also because these words are often sufficiently unusual as to not be useful to the user.

Once new keywords have been extracted, groups of the new keywords may be presented to users in order of their predicted relevance to the concept. Then, users may examine the suggested keyword sets and decide to include or exclude one or more sets, often by examining some of the documents chosen (i.e., the documents associated with the extracted keywords). Upon a user decision that a set of keywords is relevant, that set may be used to expand the reference set. Similarly, upon a user decision that a set of keywords is not relevant, that set may be utilized to shrink the search set. Embodiments of the invention refine both the reference and search sets via user indication of relevance or irrelevance of suggested keywords. As the search and reference sets are updated with knowledge from the user, the steps in accordance with embodiments of the invention (as detailed above) may be repeated to produce a new set of extracted and suggested keywords to offer the user. After interacting with the system in this iterative manner for one or more iterations, the user may determine that effectively all documents will be found and thus no more keyword searching or extraction is necessary.

Preferred embodiments of the invention are implemented on a computing device that includes a processor and utilizes various program modules. Program modules may include or consist essentially of computer-executable instructions that are executed by a conventional computer. Generally, program modules include routines, programs, objects, components, data structures, etc. that performs particular tasks or implement particular abstract data types. As used herein, a "computer network" is any wired and/or wireless configuration of intercommunicating computational nodes, including, without limitation, computers, switches, routers, personal wireless devices, etc., and including local area networks, wide area networks, and telecommunication and public telephone networks.

Those skilled in the art will appreciate that embodiments of the invention may be practiced with various computer system configurations, including multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote computer-storage media including memory storage devices.

Thus, systems in accordance with embodiments of the present invention may include or consist essentially of a general-purpose computing device in the form of a computer including a processing unit (or "processor" or "computer processor"), a system memory, and a system bus that couples various system components including the system memory to the processing unit. Computers typically include a variety of computer-readable media that can form part of the system memory and be read by the processing unit. By way of example, and not limitation, computer readable media may include computer storage media and/or communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

Any suitable programming language may be used to implement without undue experimentation the functions described above. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of systems and techniques of the invention. Rather, any number of different programming languages may be utilized as is necessary or desirable.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general-purpose processor, but may utilize any of a wide variety of other technologies including special-purpose hardware, a microcomputer, mini-computer, mainframe computer, programmed micro-processor, micro-controller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), RFID processor, smart chip, or any other device or arrangement of devices that is capable of implementing the steps of the processes of embodiments of the invention.

Thus, as depicted in FIG. 1, a document searching and retrieval system 100 in accordance with various embodiments of the invention features a server 110 (that includes a computer processor 120), a document database 130, a keyword database 140, a classification module 150, an extraction module 160, and a results module 170. The document database 130 electronically stores one or more documents from a reference set of documents each pertaining to a pre-determined concept and containing text matching at least one reference keyword (which may be for example, received in a search query pertaining to the pre-determined concept). The document database 130 also electronically stores one or more documents from a search set of documents that are not within the reference set. One or more of the documents in the search set are typically relevant to the pre-determined concept and, in accordance with various embodiments of the invention, will be identified as relevant even though they do not include the reference keyword(s). The reference keywords associated with the documents in the reference set are stored in the keyword database 140. As utilized herein, the term "electronic storage" broadly connotes any form of digital storage, e.g., optical storage, magnetic storage, semiconductor storage, etc. Furthermore, a document may be "stored" via storage of the document itself, a copy of the document, a pointer to the document, or an identifier associated with the document, etc. The system 100 also typically includes a communications interface 180 for accepting, from one or more users 185, user input such as search queries and indications regarding the relevance of keywords extracted during document searching and retrieval. The communications interface 180 may include or consist essentially of, e.g., one or more input devices such as a keyboard, mouse or other pointing device, or microphone (for spoken input) and/or one or more output devices such as a display, printer, speaker, etc. The communications interface 180 may communicate with the server 110 (e.g., with the computer processor 120) and/or various modules locally or over a computer network 190.

Figure 2:
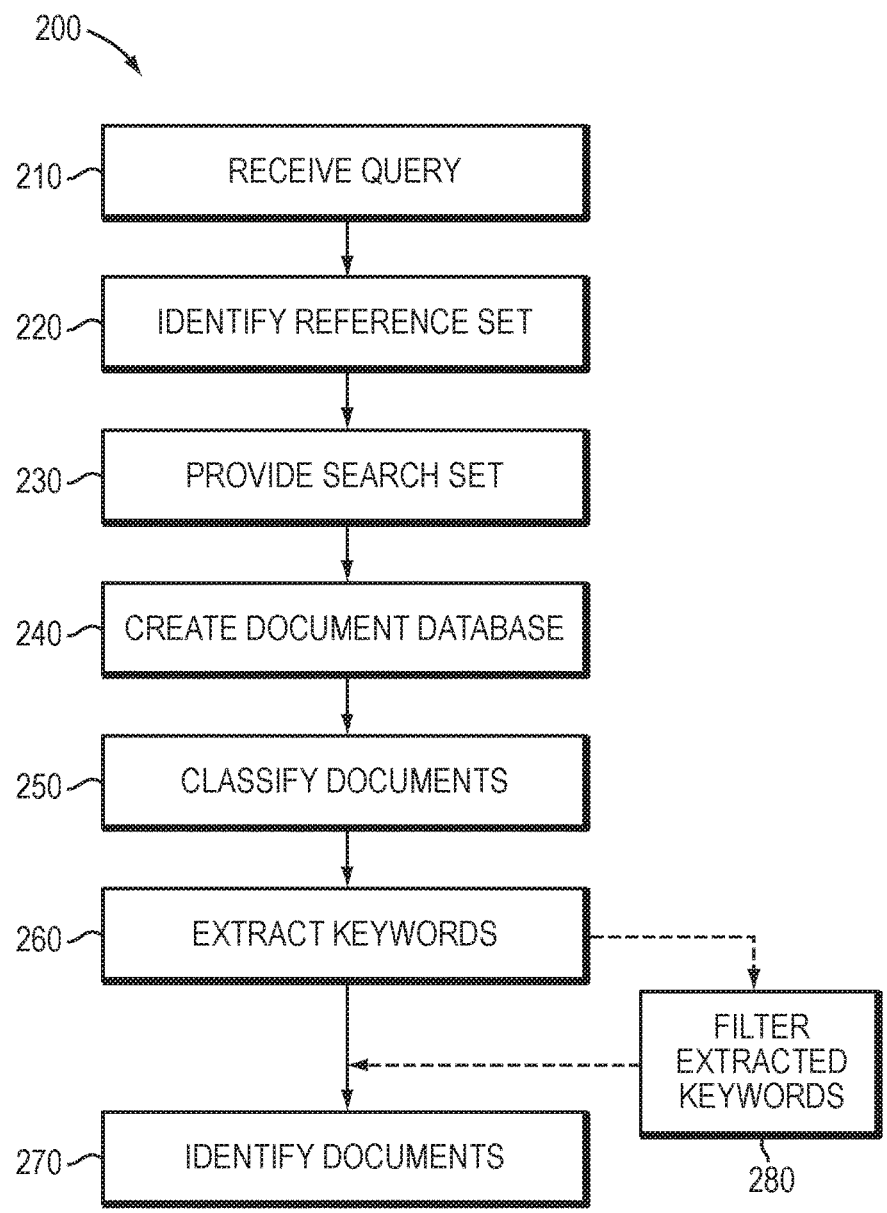
FIG. 2 is a flowchart of a method for document searching and retrieval in accordance with various embodiments of the present invention.

FIG. 2 depicts an exemplary method 200 of document searching and retrieval in accordance with various embodiments of the present invention. As shown, in accordance with various embodiments, in step 210 of method 200, a search query that includes one or more reference keywords and that pertains to a particular pre-determined concept is received (e.g., from a user 185) over the communications interface 180. In step 220, in response to the query, the system 100 electronically identifies the reference set of documents that contain text matching the reference keywords and that are presumably relevant to the pre-determined concept. As utilized herein, "electronically identifying" documents may include or consist essentially of displaying all or a portion of each document, a list of the documents (by, e.g., title or abstract), etc. In step 230, an electronically stored search set of documents is provided. As detailed above, the search set may be defined by a broader set of keywords, a convenience sample, all available documents, or the entire Internet. The documents in the search set are typically not also within the reference set, and one or more of the documents in the search set are relevant to the pre-determined concept. In step 240, the document database 130 is utilized to store one or more documents from the reference set as well as one or more documents from the search set.

In step 250, the classification module 150 then classifies documents in the database 130 into first and/or second classified sets without utilizing the reference keywords. The classification module 150 may implement, e.g., one or more of the classifiers discussed above such as tf-idf and/or SIPs. The first classified set typically contains documents from the reference set and the search set that are predicted to be relevant to the pre-determined concept. Likewise, the second classified set contains documents from the search set (and, in some embodiments, the reference set) that are predicted not to be relevant to the pre-determined concept. In step 260, the extraction module 160 then extracts, from the classified documents, keywords that are predicted to be relevant to the pre-determined concept but that are not already in the keyword database 140. As detailed above, these extracted keywords are then utilized to expand the corpus of relevant search results beyond those in the reference set associated with the original reference keywords. In step 270, the documents containing one or more of the extracted keywords are electronically identified (e.g., displayed to the user 185) by the results module 170 in response to the search query along with the reference set of documents. In this manner, the search results provided in response to the search query are expanded beyond those immediately found to be relevant (by virtue of including one or more of the reference keywords provided in the search query) via the classification and extraction detailed herein.

In some embodiments, the method 200 may include a step 280 in which the extracted keywords are filtered to further refine the additional documents provided to the user 185. For example, one or more of the extracted keywords may be displayed, and the user 185 may indicate (e.g., over the communications interface 180) the relevance or irrelevance of one or more of the extracted keywords. When the user confirms the relevance of a keyword, that keyword may be added to the keyword database 140 (as a reference keyword), and the documents associated therewith (i.e., containing the keyword) may be added to the reference set of documents. When the user 185 indicates that an extracted keyword is irrelevant, the documents associated with the keyword may be removed from the search set of documents, thereby removing documents perceived not to be relevant from the corpus of searched documents. Step 280 may be repeated one or more times with various ones of the extracted keywords.

Exemplary Applications

Censorship Evasion

Censorship of the Internet is pervasive in various countries. Governments, as well as social media operations and other firms that operate within their jurisdictions, use techniques such as keyword blocking, content filtering, and search filtering, to monitor and selectively prune certain types of online content. Even in highly developed countries, commercial firms routinely "moderate" product review forums, and governments require the removal of "illegal" material such as child pornography. Each of these practices is a special case of censorship.

In response, online citizens (or "netizens") who hope to continue discussion about censored topics often respond with alternative phrasings in a continuing effort to evade censorship. For example, immediately after the Chinese government arrested artist-dissident Ai Weiwei, the government began censoring the Chinese word for AiWeiwei (as described in, e.g., Gary King, Jennifer Pan, and Margaret E. Roberts, "How Censorship in China Allows Government Criticism but Silences Collective Expression," American Political Science Review 107:1-18 (2013), the entire disclosure of which is incorporated by reference herein); soon after, netizens responded by referring to the same person as "AWW," and the Chinese word for "love," which in Chinese sounds like the "ai" in "AiWeiwei." Embodiments of the present invention may define the reference set as social media posts containing the term "Ai Weiwei" and the search set as all social media posts, or those from a specific region or about some of the topics at issue. Embodiments then enable researchers to identify the alternative keywords and thus the associated social media posts on the same topic. In this matter, embodiments of the invention enable users to continue to follow conversations even in the presence of creative authors.

Conversational Drift

Political scientists, lobby groups, newspapers, interested citizens, and others often follow social media discussions on a chosen topic but risk losing the thread, and the bulk of the discussion, when changes occur in how others refer to the topic. Some of these wording changes are playful or creative; others represent major political moves to influence the debate or frame the issues. For example, what was once called "gay marriage" is now frequently referred to by supporters as "marriage equality." Progressive groups also try to change the discussion of abortion policy from "pro-choice" and "pro-life," where the division is approximately balanced, to "reproductive rights," where such groups have a large majority. Conservatives have similarly tried to influence the debate by relabeling "late term abortion" as the more unpopular "partial birth abortion." As these examples show, selecting an incomplete set of keywords may result in severe selection bias, as they may be highly correlated with the opinions being studied. Embodiments of the present invention extract these document sets and suggest keywords directly from text as it is written, rather than waiting for many people to determine the relevant keywords so that the information may be harvested from weblogs and other search data.

Product Advertisements

Those purchasing online advertising often bid to buy ad space next to searches for chosen keywords. For example, to sell a vacuum cleaner, one might bid for search keywords "carpet," "vacuum," "Hoover," etc. This is common with Google adwords, Bing Ads, etc. These systems, and other existing approaches, suggest new keywords to those spending advertising dollars by mining information from structured data such as web searches, weblogs from specific web sites, or other ad purchases. Embodiments of the present invention supplement these existing approaches by mining keywords from raw unstructured text found in company documents, customer call logs, customer product reviews, web sites, or a diverse array of other sources. Whereas keywords (or more general Boolean searches) for advertising on search engines may be mined from search engine query logs or web site logs, keywords that identify rarely visited pages, or for advertising on social media sites, generally may only be mined from the unstructured text.

Legal Discovery

Electronic discovery, or "e-discovery" has become a central part of a broad array of civil litigation. Once a lawsuit is filed, and standing is granted, attorneys on both sides typically must agree on the documents at issue. Often the plaintiffs try to expand the document set, while defendants try to narrow the list. In the "culling" phase of document review, an initial set of keywords is identified. Then, a sample of documents is manually reviewed, and each document is determined to be relevant or irrelevant. The set of keywords is then narrowed or expanded depending on how many documents within the sample are relevant to the topic. A more immediately relevant set of keywords, as provided by embodiments of the present invention, may not only assist in fair judgments of these cases, but also in cutting unnecessary costs required for review of excessive numbers of documents.

Searching for Sets of Documents

There is an important but underappreciated distinction between two uses of modern search engines. In the first, users seek one or a small number of the most relevant web sites or documents, a technique that may be designated as "fact finding." For example, to find the capital of Montana, a user typically only wants one site (or a small number of sites) returned in response to the query. To assist with this technique, search engine developers spend a great deal of effort ranking web sites to reflect user intent. In a second "overviewing" or "collecting" technique, users do not try to find one particular site or document; instead, they attempt to identify all sites or documents that discuss a particular topic, product, business, person, or concept. Thus, the goal is an exhaustive list rather than the most appropriate site. Some of the many examples of overviewing or collecting include scholarly literature reviews, vanity searches, and company due diligence.

Search engines are optimized for fact finding, but are nevertheless regularly used for collecting, even though they are often suboptimal for that alternative purpose. This suggests that they may be substantially improved by incorporating embodiments of the invention in order to identify a document set (and associated keywords) relevant to a chosen topic. In accordance with various embodiments, the user may define a reference set by choosing a narrowly defined list of keywords (and verifying that the documents returned largely include those of interest). Then, a very broad set of keywords may be used to define the search set, and other relevant keywords are suggested to help the user identify other relevant documents that were excluded from the reference set.

Searching when Query Logs are Uninformative or Unavailable, or "Long Tail Search"

Modern search engines typically work best when prior searches and the resulting user behavior (such as clicking on one of the web sites offered or not) are used to continuously improve search results. However, in some areas, such metadata is inadequate or unavailable. These areas may include (1) traditional search with unique or unusual search terms (the "long tail"), (2) searching on social media, where most searches are for posts that just appeared or are just about to appear, and so have few previous visits, and (3) enterprise search for (confidential) documents that have rarely if ever been searched for before. In these situations, it may be useful to switch from fully automated searching to computer-assisted searching using embodiments of the present invention.

For example, in a search on social media, a user may search "#BostonBombings" to produce a flow of social media posts. These would almost all be about the Boston bombings of 2013, but numerous others, such as #prayforboston or those about the subject without a hashtag, might be missed. In accordance with various embodiments of the invention, the results of this first search may be defined as the reference set and used to suggest new keyword sets and thus improve the set of posts displayed. Thus, the quality of the resulting search may be greatly improved. Embodiments of the invention may be similarly applied to enterprise search systems.

Starting Point for Statistical Analyses of Text

Most methods of automated text analysis assume the existence of a set of documents in a well-defined corpus, and then spend most of their effort on applying sophisticated statistical, machine learning, linguistic, or data analytic methods to this given corpus. In practice, this document set is defined in one of a variety of ways but keyword searching is a common approach. In such situations, embodiments of the present invention improve the inputs to, and thus the results from, any one of these sophisticated approaches.

Intuitive and Infinitely Improvable Classification

Because statistical classifiers typically fail to achieve high levels of accuracy (see David J. Hand, "Classifier Technology and the Illusion of Progress," Statistical Science, 21, 2006, pp. 1-14, the entire disclosure of which is incorporated by reference herein), analytically unsophisticated users finding individual documents misclassified may question the veracity of the whole approach, and have little recourse to improve the result. Moreover, since classifiers usually optimize a global function for the entire data set, even sophisticated users may find of value a way of adding effort to improve classification at the level of smaller numbers of documents.

In this situation, a simple keyword-based classifier is sometimes more palatable to users because the reasons for mistakes, even if there are more of them, are readily understandable. Keyword classifiers are also much faster and may be improved to any higher level of accuracy by continual refinement of the keyword list. Embodiments of the present invention, which use statistical classifiers to find a keyword-based classifier for the user, may thus offer a useful alternative approach in this situation.

EXAMPLES

Four exemplary illustrations utilizing embodiments of the present invention are presented below. For simplicity and ease of replicability, these exemplary illustrations utilize six computationally fast classifiers (naive Bayes, k-nearest neighbor (k=5), logistic regression, support vector machine, decision tree, and random forests), and 100 randomly selected training sets (run as parallel processes). The training sets each have 1,000 documents (except in the smaller corpus in the first example, where 200 documents are used). In each case, embodiments of the invention succeed in finding keywords that would be highly unlikely to be identified by a human being doing this task entirely by hand, as well as some a human might have identified but only if he or she had spent a great deal more time thinking about it. Note that in many cases, the keywords appear to be clearly related to the reference topic and may seem quite "obvious" to the user. However, most such words are only obvious after they are identified, so the benchmark by which the usefulness of a keyword is judged is not whether the keyword is obviously related to the reference topic, but rather whether or not a user would have identified the keyword beforehand without utilizing embodiments of the present invention.

Obamacare and the Supreme Court Decision on the Affordable Care Act

In March 2010, President Obama signed the Patient Protection and Affordable Care Act into law. By the time the Affordable Care Act was brought before the Supreme Court in June 2012, the nickname "Obamacare" was commonplace among both in both Democratic and Republican conversations. Because of the many ways of referring to the healthcare act, defining a search on social media that would enable one to follow coverage of the Supreme Court decision online, and especially to distinguish it from posts about one's personal health or healthcare became a difficult task. Embodiments of the present invention offer a simple solution.

In this exemplary implementation, search and reference sets were created of social media posts (and having sizes 367 and 689, respectively) from blogspot.com in June of 2012.

(In other embodiments, these sets may be much larger, but this exemplary implementation demonstrates essential features of the technique.) The reference set was defined as posts with the word "Obamacare," and it was known with high probability that these posts referenced the Obama healthcare act in question. For the search dataset, social media posts were selected that use the keyword "healthcare" (and by definition not the word "Obamacare"). In this first example, only two clusters are utilized for simplicity; other embodiments may utilize more than two clusters. The keyword combinations were also restricted to be only those of length 1 (single keywords) and which appeared in at least 10 documents in the entire search set.

FIG. 3 shows the top 25 keywords (from a much longer list) from each of the two clusters identified in accordance with embodiments of the present invention. (FIG. 3 and subsequent figures provide keyword stems, and, for stems that are not whole words, the underlined portion is utilized to provide the most logical word used within the search set based on context.) As shown, these lists are helpful distinguishing documents within the search set, some obvious and some that would have been very difficult to identify by hand, without utilizing embodiments of the present invention. For example, Cluster 1 appears to be composed mainly of documents pertaining to Obamacare. Specifically, Cluster 1 includes many of the keywords relating to the politics of Obamacare (obama, mandate, republican, senate, tax, penalty) and to the Supreme Court rulings on Obamacare (supreme, court, constitutional, uphold, roberts, repeal, justice, decision, unconstitutional). However, Cluster 1 also includes a somewhat surprising reference to Congress and the commerce clause (congress, clause, commerce). The reference here refers to the debate over whether or not Congress is allowed to regulate healthcare and impose the individual mandate from Obamacare under the commerce clause in the Constitution. While this was a significant argument that the Supreme Court rejected at the time, it is unlikely that the average user would think of searching for the commerce clause when thinking about Obamacare. Cluster 2, on the other hand, appears to consist of documents on a variety of topics related to healthcare that do not pertain to Obamacare. The top keywords from Cluster 2 are less coherent from a topic standpoint because of the diversity of ways about which healthcare might be written. Nevertheless, Cluster 2 does include words related to the healthcare field (develop, medicine, intern, experiment, study, hospital, clinic, medical, profession) as opposed to the political issue of Obamacare.

Identifying Child Pornographers Online

Child pornography is illegal in the United States. However, the Internet has made the distribution of such illegal material easier to spread quickly on the open web, on forums, and through peer-to-peer sharing services. Producers and consumers of this material hide in plain sight, trying to stay in contact with each other while still evading the authorities. The key to fighting the spread of such material online (and preventing the subsequent damages to those pictured) is identifying commonly used keywords that child pornographers use to distribute the images. In this example, embodiments of the invention were utilized with the cooperation of the Department of Homeland Security (DHS) to help find keywords that may have been difficult to detect otherwise. A thesaurus or other method used to mine a reference set would be of little use when content creators change their language so frequently and intentionally.

First, a reference set of 2,039 documents consisting of forums and blogs containing at least one of four words the DHS knew to uniquely define child pornography was identified. A search set of 9,340 documents was utilized, defined by the word "pedo", which is sometimes associated with child pornography and at other times used colloquially. The documents were all collected between August and October 2013. The exemplary embodiment utilized eight clusters, and results from four of these clusters appear in FIG. 4. (FIG. 4 only shows words that appear in at least 1 percent of documents within the cluster.) The first two clusters produced keywords that are substantively related to child pornography, most of which are sexual in nature. One surprising keyword that appears is bbs, which refers to the bulletin board systems that child pornographers often use to exchange links and advice over where to find child pornography. The word loli also appears, which seems to be an evolution from lolita, a traditional search term for child pornographers. Clusters 3-6 (not shown) do not appear to have any coherent topics based on the top keywords. Interestingly, in cluster 7, the top words all appear to be from Slavic languages, mostly Serbo-Croatian. In cluster 8, the top keywords are all Spanish words. Thus, embodiments of the present invention are able to determine the different languages that exist within the search set using the search term "pedo" and the keywords produced allow the user to discern these languages, and rule out those lists, quickly.

Tweets about the Boston Bombings

On Apr. 15, 2013, two bombs exploded near the finish line of the Boston Marathon, killing two people and injuring dozens. In the police chase and city shutdown that followed in the week after the bombings, Twitter was flooded with conversation about the bombings and giving updates of events around the city. Of course, the tweets used different words to describe the bombings, as the conversation about the bombings shifted from the event itself to the investigation and car chase that followed.

In this example, the established goal was to find keywords that could collect the full set of Twitter posts about the bombings from posts related to other events or topics related to Boston. To do so, a reference set of 7,643 documents using the hashtag #BostonBombings and a search set of 9,655 documents with the word Boston but without the hashtag #BostonBombings were defined. Twitter data containing these words was gathered during the 2013 year and an embodiment of the present invention was utilized with two clusters to find relevant keywords that separated the bombing incident from other events in Boston.

FIG. 5 shows the top 25 keyword combinations identified in each of two clusters, as well as other interesting keywords outside of the top 25 that appear in at least 10 documents within the cluster. In this example, AND statements (noted as "&") were included. For example, the rule suspect & marathon in Cluster 1 suggests that searching tweets that include both words (not necessarily in order or adjacent). Unsurprisingly, the word suspect, either by itself or in combination with other words, ranks highly in tweets about the bombings, since social media discussion focused heavily on finding and apprehending the two bombing suspects in the few days after the bombings. Most of the other keywords in Cluster 1 are also substantively related to the bombings, with keywords describing the attack or the suspects (attack, kill, tsarnaev, dzhokhar), the relation to terrorist activity (muslim, terrorist), law enforcement activity (police, fbi, investigate, arrest), and media coverage of the event (report, news, cnn).

FIG. 5 includes some surprising keywords in the lists that users may not have been able to identify without an embodiment of the present invention. For example, the 35th keyword in Cluster 1 (#tcot) refers to a popular hashtag on Twitter that stands for "top conservatives on Twitter." This keyword would probably not have been found by users doing keywords by hand but it captures a significant political trend of conservatives responding to the attacks. Also shown are two hashtags that were used consistently in reference to the bombing attacks: #bostonmarathon at number 23 and #prayforboston at number 29. At number 99, the hashtag #benghazi is found, another keyword that would likely not have been found by hand. This hashtag captures a sentiment among certain individuals that linked both the Boston bombings and the 2012 Benghazi attack on the US diplomatic mission in Libya as terrorist attacks that the Obama administration failed to stop.

Shown in Cluster 2 are keywords that characterize Twitter discussion related to Boston that is not about the bombings. (Also found are a few common Spanish words (los, que, por, del), which reflect the presence of Spanish posts in the search set.) Interestingly, the overwhelming discussion on Twitter of Boston outside of the bombings is about Boston sports (game, red & sox, celtics, bruins, fan, win, #mlb, series). Also found are a few surprises that users may not have considered. At number 44 is the hashtag #jobs, which is related to Twitter discussion about job openings available in Boston. At number 77 is found references toward Boston as a university town, including Boston College (college). Further down the list at 133, the keyword kevin is found, which can refer to both Kevin Garnett, the former popular Celtics basketball player, and Kevin Spacey, the actor who named his dog "Boston" to honor the Boston bombing victims. This illustration of the Boston bombings has demonstrated that embodiments of the invention may be utilized to help find keywords that are both obvious and non-obvious and are related to our topic of interest. Also demonstrated is the power of keywords and how interesting discussion on Twitter about various other topics may be tracked.

Identifying Blog Posts Related to Bo Xilai

In March of 2012, the Chinese government removed Bo Xilai from his post as party chief in Chongqing. Bo had been one of the most popular politicians in China, known for promoting a return to Mao Zedong thought. His policies in Chongqing, known as the "Chongqing model," including fighting corruption and encouraging a return of "red" culture, were controversial within the Chinese Communist Party, but were hugely popular within parts of the Chinese population.

Bo, however, is thought to have engaged in many illegal activities himself, including wiretapping of other Communist Party officials as well as having a part in the murder of a British man named Neil Heywood in November, 2011. Wang Lijun, Bo's police chief, became aware of these activities and Bo suddenly demoted Wang in January, 2012 Immediately after his demotion, Wang Lijun fled to the U.S. consulate in Chengdu. Wang reportedly provided the U.S. consulate evidence against Bo, outing the Chinese politician. Not long after the Wang Lijun incident, Bo was removed from his post as party chief and stripped of his membership in the Chinese Communist Party.

Although the Bo Xilai scandal includes many more details than can be delineated here, the main takeaway is that the scandal itself rattled the Chinese Communist Party soon before the November 2012 leadership transition. Coverage of the event was highly controlled within the Chinese news media and objectionable material about the event was quickly removed from the Chinese Internet. "Bo Xilai" was heavily censored. However, many netizens continued to talk about the scandal online, without using Bo Xilai's name. For researchers studying the online discussion of the Bo Xilai incident, and public policy officials and others attempting to follow this event in real time, finding alternative keywords used to describe the event is imperative to identifying documents related to the discussion.

In accordance with an embodiment of the present invention, reference and search datasets specific to the scandal were identified. All social media posts prior to the Chinese government censorship was initiated were gathered (for example, using methods described in King, Gary, Jennifer Pan, and Margaret E. Roberts, 2013, "How Censorship in China Allows Government Criticism but Silences Collective Expression," American Political Science Review 107:1-18, the entire disclosure of which is incorporated by reference herein), but the relevant posts required identification. The reference set was defined as 913 social media posts that contain the word "Bo Xilai" at the time of the scandal, and the search set was defined as 938 posts that use the word "Chongqing," the city of which Bo Xilai was the party chief (and by definition, do not use the word "Bo Xilai").

The keywords identified are presented in FIG. 6. The words in Cluster 1 are most related to the scandal, while the words in Cluster 2 are less related to the scandal. (FIG. 6 only depicts keywords appearing in at least 1 percent of the documents in the cluster.) It may be seen that the most likely word to be related to the scandal is Wang Lijun, the police chief who reported Bo and "incident." Many people called the Bo Xilai scandal the "Wang Lijun incident" or the "Chongqing incident" instead of using the name Bo Xilai. Also shown are words that could refer to Bo without his name. "Leader" in conjunction with Chongqing would accurately describe Bo at the time, without using his name. In addition, there are words specifically related to Bo's policies which many think were related to the arrest, in particular his emphasis on singing "red songs" and revival of Maoist policies, including reminiscing about the Cultural Revolution and appealing to the masses.

Cluster 2 suggests words that are related to the city of Chongqing, but not the Bo Xilai scandal. These words include names of provinces that might be listed with Chongqing, other cities like Chongqing, and words related to cities like city centers, or shopping). Certainly none of these would help identify text about Bo Xilai or the Bo Xilai scandal.

Exemplary Demonstrations

As described in more detail below, a "placebo test" was performed in order to demonstrate that when there is no pattern in the data, the resulting keywords do not pick up any meaningful keywords or topics. Tests were then performed to demonstrate the ability of embodiments of the present invention to produce keywords that retrieve the target set with some degree of accuracy. Finally, a methodological issue regarding intentionally mislabeled training data is addressed below.

Placebo Test

Embodiments of the invention were tested against false positives in order to verify that when there is no pattern within the data, meaningful keywords are not generated. 9,988 documents from a selection of all English language social media blogs and reviews from January 2013 to March 2014 were randomly sampled. Within this set, 3,000 of the documents were randomly sampled to be the reference set, with the remaining 6,988 being defined as the search set. There should be no significant substantive difference between the two sets on any dimension, and the resulting generated clusters and keywords should not reflect any meaningful topics.

FIG. 7 shows the results on the random reference and search sets. As expected, there is no coherent pattern to the keywords and no obvious topic in either of the two clusters. When the reference set is incoherent or when the target set does not exist, the keywords within a cluster should appear to be random as well, and that does appear to be the case.

Target Set Retrieval

In this section, the ability of the system to produce keywords that retrieve the target set is validated, using several examples in which the target set or its approximation is known in advance. The more specific goal is to retrieve as much of the target set as possible, using only keywords, while minimizing the retrieval of documents outside the target set.

To measure the ability to retrieve the target set, the two metrics recall and precision, which are widely used in the pattern recognition and information retrieval literature, are utilized. Recall is the percentage of the entire target set that is retrieved, while precision is the percentage of the retrieved set that belongs to the target set:

$$\text{Recall} = \frac{\text{\# of target set documents retrieved by keywords(s)}}{\text{\# of documents in target set}} \times 100$$

$$\text{Precision} = \frac{\text{\# of target set documents retrieved by keywords(s)}}{\text{\# of documents retrieved by keyword(s)}} \times 100$$

In retrieving the target set via keywords, ideally both recall and precision would be maximized. However, recall and precision are inversely related, so one must usually compromise between the two goals depending on the specific application and goal at hand. In tests, various embodiments of the invention produce keywords that are substantively related to the reference topic in the cluster(s) with higher average probabilities of being classified in the reference set. Each individual keyword has limited recall given that there are rarely words that are common across a large percentage of the target set. However, recall generally monotonically increases as the number of keywords included with OR statements increases, so combining keywords together in a Boolean search may greatly improve recall. Furthermore, in additional tests, the top keywords in clusters that appear substantively related to the reference topic have much greater precision than keywords in seemingly non-related clusters.

Composite Search Set

To establish a baseline level of performance, a composite set with 3,000 posts from Twitter for each of five distinct topics from 2013 or early 2014 was created, each one using very specific keywords or hashtags:

1. SF BatKid: Tweets about the trending topic of Miles Scott, a five-year-old cancer survivor in San Francisco who became Batkid for a day, using hashtag #SFBatKid.

2. Nelson Mandela's passing: Tweets about the death of Nelson Mandela, affectionately known as "Madiba," using hashtag #Madiba.

3. Hate speech toward people of Mexican descent: Tweets containing at least one of the terms, stupid spic, stupid spick, wetback, fuckin spic, or fuckin spick.

4. Geek chic: Tweets about the fashion trend using the phrase geek chic.

5. Boston Marathon bombing: Tweets about the Boston Marathon bombing using the hashtag #Bostonbombings (i.e., the same data used in the example detailed above).

The 3,000 posts from each topic were combined to create a search set of 15,000. A reference set of 4,102 separate tweets with hate speech was then created using the same search terms listed above in topic 3. Since it was known which of the 15,000 posts corresponds to the hate speech topic, the system may be utilized to find keywords using the hate speech reference set and measure the keywords with the recall and precision metrics.

FIG. 8A displays the top 25 keywords in each of the two clusters in one run of the system. The corresponding FIG. 8B plots each keyword with recall horizontally and precision vertically, measuring how well the system retrieved the target set of hate speech posts. Cluster 1 is denoted as 800, and Cluster 2 is denoted as 810. (In FIG. 8A, as in other figures, if the keyword stem is not a word, the most logical word used within the search set based on context is used (and indicated with underlining))

The results in FIG. 8A clearly show that the keywords in Cluster 1 are very much related to hate speech, with various expletives, derogatory terms, and other terms about people of Mexican descent. The keywords in Cluster 2, in contrast, are a combination of the most significant terms in the other four topics, with much lower recall and precision for the target set of interest. The recall and precision metrics also show that the terms in Cluster 1 are much higher in both recall and precision than Cluster 2. Any single keyword has relatively low recall given how varied a typical target document set is in terms of word usage, but the precision is almost always quite high. In this simplest of examples, it is clear that the system performs as desired in producing meaningful keywords that help retrieve the target set.

Figure 9:
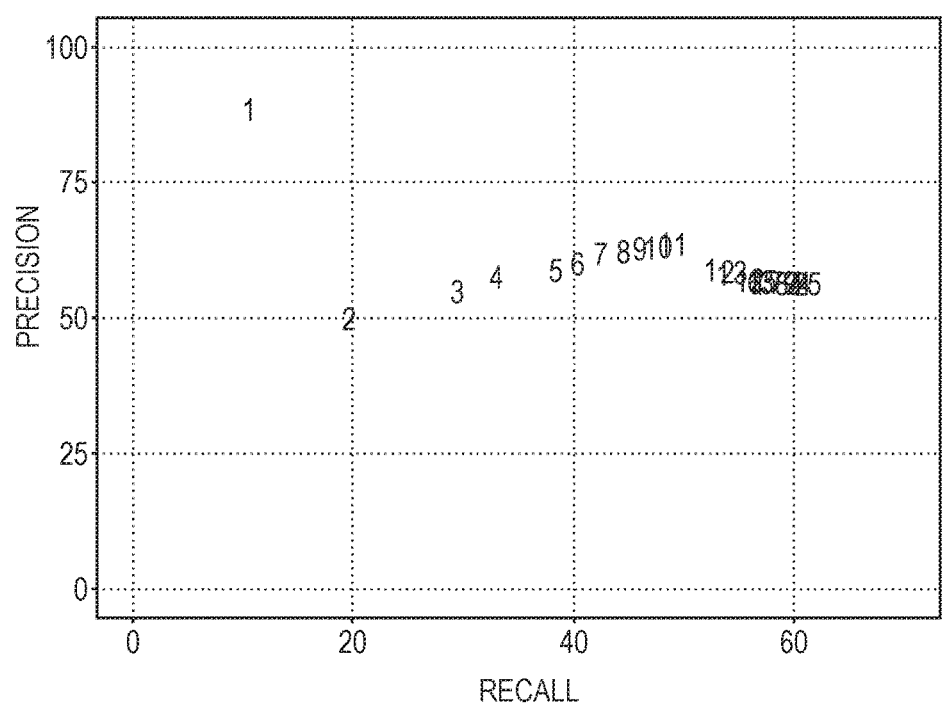
FIG. 9 graphically presents precision and recall results from different combinations of keywords from Cluster 1 in FIG. 8A with OR statements in accordance with embodiments of the present invention.

In FIG. 9, another exemplary usage of the system was demonstrated by retrieving the target set using the set of keywords in Cluster 1 in FIG. 8A and combining them with OR statements. First, the first keyword in the list was taken, and recall and precision in retrieving the target set were measured. The values are denoted by the point "1" in the figure to represent the first keyword. Next, the first two keywords were combined to make an OR statement (i.e., 1 OR 2). Documents that contain at least one of the first two keywords were retrieved, and recall and precision were measured. The values are denoted by the point "2" in the figure, which means that two keywords were utilized in an OR statement. This process of adding each keyword down the list into the search term was continued until all of the top 25 keywords in the search were included (denoted by the point "25" in the figure), finding documents that contain at least one of the 25 keywords.

In FIG. 9, the pattern becomes very apparent. Using more keywords in an OR combination monotonically increases recall as more documents are retrieved. Precision generally decreases, although the relationship is not monotonic. In this simple example, searching for documents in the search set with at least one out of the top 25 keywords retrieves approximately 60 percent of the target set, but out of those documents found, a little less than one-half are not from the target set.

Hashtag-labeled Search Set

In this example, a more heterogeneous validation set is created, where, as usual, the division between topics is more ambiguous. To do this, real examples are taken where authors of Twitter posts imperfectly code the topics themselves via hashtags. Three examples from popular hashtags during 2013-2014 were chosen, as shown in Table 2 below.

For each, a set of posts defined by the hashtag (second column) was selected. Within this set, a reference set was defined using another term used in this set of posts (third column). The remainder of the set not chosen became the target set. The target set was combined with added search set documents defined by another term (last column) to create the entire search set.

TABLE 2

| Topic | Hashtag | Reference Set | Added to Search Set |
|---|---|---|---|
| 1. Nelson Mandela's passing | #Madiba | Mandela OR Nelson Mandela | South Africa |
| 2. SF BatKid | #SFBatKid | Miles | San Francisco |
| 3. Women of color within the feminist movement | #SolidarityIsForWhiteWomen | white feminist OR white feminists | racism |

The hashtag thus "coded" the topic of both the reference and target sets. The hashtag was utilized for coding purposes only, and it was removed from the documents before the classification step. While any post that includes the hashtag was likely to be about the same topic, there may also have been posts in the search set about the topic that do not include a hashtag.

In the first example, tweets about President Nelson Mandela's passing in December 2013 were examined with a reference set of 3,147 tweets and a search set of 13,797 tweets in 2013 or early 2014. The goal was to identify keywords that distinguish tweets about Mandela from tweets about South Africa in general. The hashtag that was used to code tweets about Mandela, #Madiba, was Mandela's clan name as well as a name for him that was generally used affectionately. The system utilized two clusters and presented recall and precision for the target set of tweets with #Madiba but without Mandela or Nelson Mandela.

FIG. 10A shows the top 25 keywords from the two clusters; Cluster 1 is indicated as 1000 on FIG. 10B (and also includes the terms "odi" and "new"), and Cluster 2 is indicated as 1010. As shown, various words describing Mandela's passing (hospitalized, critical, condition) as well as tributes to him (tribute, prayer, freedom, pray, thought & prayer, legacy) were identified. Also found was a non-obvious affectionate name for Mandela: tata, which means "Father," since Mandela was often described as "the father of the nation." Interestingly, also found were references to @ewnreporter and #sabcnews, two entities on social media that covered Mandela's passing heavily. Users would have likely been unable to find these references without the use of the system. Since the search set encompasses a large timespan, the target set includes tweets about Mandela's birthday as well as about his passing (birthday, birthday & happy). In Cluster 2, keywords that are related to South Africa more generally apart from Mandela are found. Capetown (cape & town) appears significantly as one of the most discussed cities in South Africa. The Twitter account @trendssthafrica, which has 80,000+ followers and tracks South Africa Twitter trends, appeared as a significant keyword as well. FIG. 10B depicts the same pattern as in FIG. 8B, i.e., that the top keywords in Cluster 1 have high precision in retrieving the target set compared to keywords in Cluster 2.

A second hashtag verification example pertained to the San Francisco BatKid event. A reference set of 293 tweets and a search set of 14,901 tweets from 2013 and early 2014 were utilized. The system utilized two clusters to try to distinguish keywords about BatKid in a search set that contained a target set labeled with #SFBatKid and also a general search set about San Francisco.

Figures 11A, 11B:
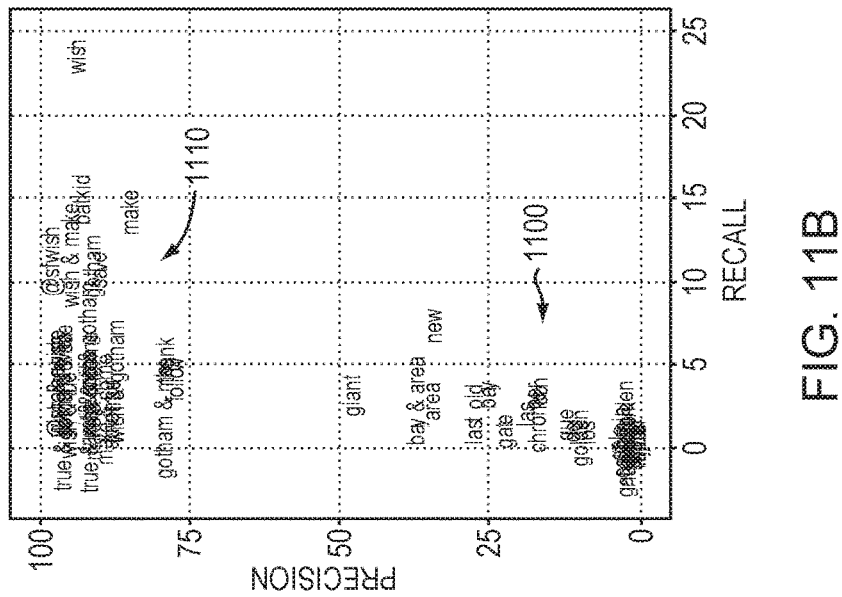
FIG. 11A depicts keywords from each of two clusters of documents identified in accordance with embodiments of the present invention.
FIG. 11B graphically presents the keywords of FIG. 11A for evaluation based on precision and recall metrics in accordance with embodiments of the present invention.

FIG. 11A shows the top 25 keywords from the two clusters; Cluster 1 is indicated as 1100 on FIG. 11B (including words up to and including "giant"), and Cluster 2 is indicated as 1110 (and includes the term "old" embedded within Cluster 1). In Cluster 1 are shown relevant words describing the event (save, city & gotham, adventure), positive reaction to the event (wish, wish & make, thank, true & make & come), and references to the Make-A-Wish foundation that sponsored the event (@sfwish, @makeawish). In Cluster 2 generic words at the top concerning San Francisco (chronicle, golden & gate, california, bay & area, giants) are shown. Also identified are the same references to job searches (#jobs, #job) found in the Boston example detailed above.

In FIG. 11B, it is clear that in general, the top keywords in Cluster 1 outperform the top keywords in Cluster 2 in both recall and precision of the target set. The group of points in the top left corner are the keywords from Cluster 2 that originate from the 94 posts referenced above. Thus, the system successfully suggests keywords to the user to retrieve the target set and groups the keywords in an imperfect manner that nonetheless may be very helpful to the user.

The final hashtag verification example presented arose from a controversial debate on women of color in the feminist movement. In July 2013, noted author, blogger, self-proclaimed feminist, and professor of gender studies Hugo Schwyzer announced he was "quitting the Internet" due to mental health and family concerns. In August 2013, he admitted on Twitter that he had been involved in the abuse of women of color and was complicit in racism. As a response, Mikki Kendall started the Twitter hashtag #SolidarityIsForWhiteWomen to spur debate over the role of women of color in the feminist movement. Women of color began using the hashtag to voice frustration over the condescension and racism that they faced from the feminist movement. A reference set of 219 tweets and a search set of 15,668 tweets from 2013 and early 2014 were utilized. The system utilized two clusters here to try to retrieve the target set and keywords related to the debate amongst a set of tweets that mention the word "racism" in general.

FIG. 12A shows the top 25 keywords from the two clusters; Cluster 1 is indicated as 1200 on FIG. 12B (and also includes the terms "whi," "end," and "black"), and Cluster 2 is indicated as 1210 (and also includes the terms "explain," "defend," and "#news" near the terms of Cluster 1). In Cluster 1, keywords relating to the movement such as the term woc, which stands for "women of color," are identified. Also shown are other interesting and non-obvious keywords such as privilege, listen, explain, solidarity, and silence & woc. Also shown is a reference to a Twitter account (@just wizz wizz) that was actively involved in tweeting about the issue as well as a hashtag reference to the feminism conference Fem 2.0 (#fem2). In Cluster 2 vague and generic terms that are often used in conjunction with discussions of race are generally identified. In FIG. 12B, it is again obvious that the keywords found in Cluster 1 perform well in precision when retrieving the target set.

Figure 13C:
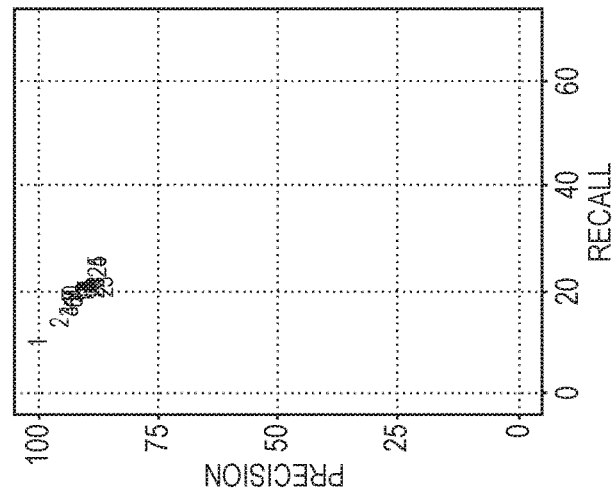
FIGS. 13A-13C graphically present precision and recall results from different combinations of keywords with OR statements in accordance with embodiments of the present invention.
Figure 13B:
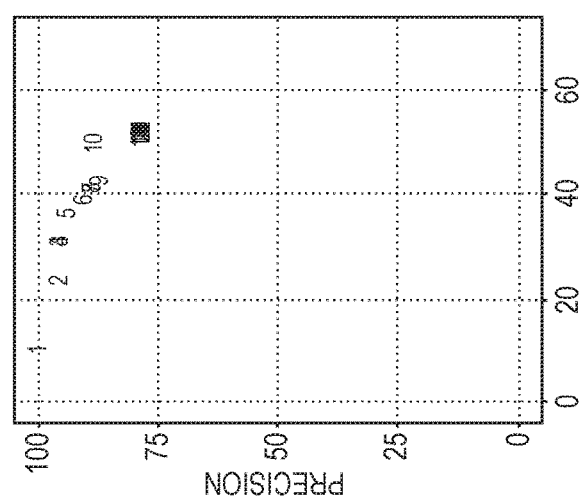
Figure 13A:
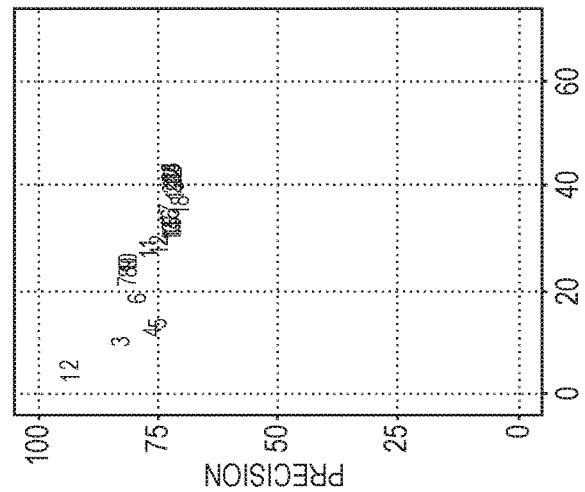

Also simulated was one potential usage of combining keywords in OR statements to improve recall of the target set. The top 25 keywords from Cluster 1 of each of the above examples were taken and combined starting from the top sequentially. FIGS. 13A, 13B, and 13C show the results of combining keywords in OR statements for each example. The numbers on the plots represent the number of keywords that were combined in the OR statement, starting from the top of the list. As expected, recall increased monotonically in the number of keywords used to search for the target set while precision generally decreased. Also, it is clear that the extent to which recall improves differs across examples. In the SF BatKid example of FIG. 13B, finding documents with at least one of the top 25 keywords led to a recall of nearly 60 percent of the target set, while using the top 25 keywords in the Solidarity example of FIG. 13C only led to a recall of just over 20 percent of the target set. This most likely reflects the heterogeneity of word usage across examples, with a larger set of words being using to describe women of color in the feminist movement than to describe the SF BatKid event.

Finally, another usage of the system was examined by incorporating NOT rules in retrieving the target set. NOT rules include keywords that describe documents outside of a cluster better than within a cluster. Since the likelihood does not differentiate between keywords that describe the cluster well versus keywords that describe the outside the cluster well, all keywords that occur in a higher proportion outside of a cluster versus in a cluster were considered as a NOT rule for the cluster. For example, suppose the word "foobar" was ranked highly by the likelihood for Cluster 1. If "foobar" was ranked highly because it was highly prevalent outside Cluster 1 and not prevalent inside Cluster 1, then the rule becomes "(NOT) foobar" for Cluster 1. In the case of only two examples, the top descriptive keywords for Cluster 2 become NOT rules for Cluster 1 and vice versa. Previous examples discarded all NOT rules for simplicity, but this example illustrates how NOT rules may also help improve recall in target set retrieval.

Figure 14A:
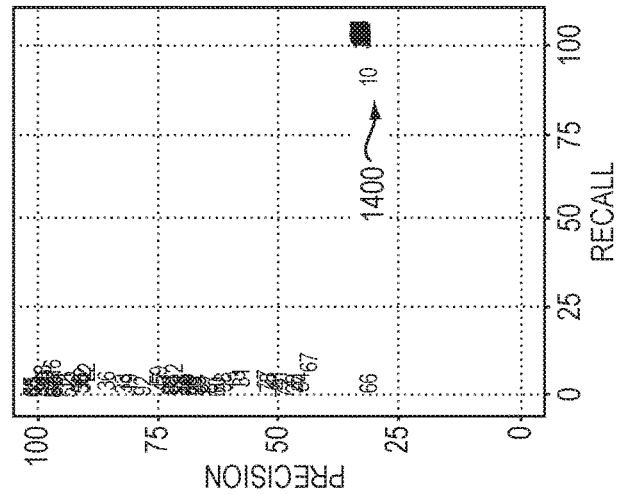
FIGS. 14A-14C graphically present precision and recall results from different combinations of keywords, including those with NOT statements, in accordance with embodiments of the present invention.
Figure 14B:
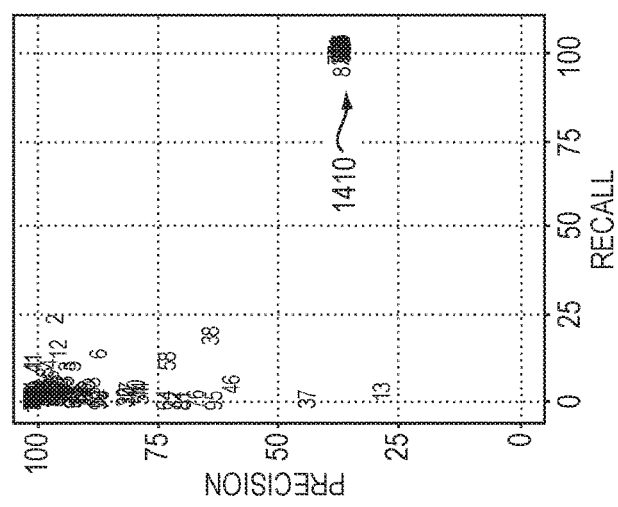
Figure 14C:
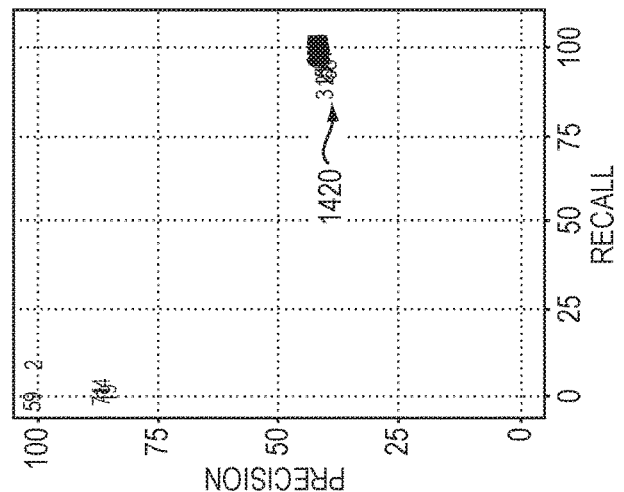

In this example, the results of which are depicted in FIGS. 14A, 14B, and 14C, the top 100 rules for Cluster 1 including any NOT rules that may rank highly were utilized. The numbers on the plots represent the ranking of each keyword rule (with NOT rules indicated as 1400, 1410, and 1420). It is immediately clear that all of the NOT rules rank very highly on recall for the target set. Consider the top rule for the Mandela example in FIG. 14A. Previously, for Cluster 1, tribute was the top ranking keyword. However, when NOT rules are included, (NOT) trend becomes the top ranking rule, with very high recall. If the user would like to retrieve the target set, the best first move would be to discard all posts with the keyword trend in it. This performs better on recall than simply picking posts with the word tribute, since the former leaves almost the entire target set intact while the latter only selects a portion of the target set. However, as expected, the former also performs poorly on precision because keeping all posts without the word tribute also includes many posts that are not in the target set. From these examples, it is clear that including NOT rules may help the user search for the target set by helping to discard posts that are not of interest to the user.

Robustness to Mislabeled Training Data

One potential concern with embodiments of the present invention is that the classification step may be incorrect due to what the machine learning literature terms as "mislabeled training data" or "class noise." As described above, a reference and search set are defined, a random training set is drawn, and then multiple classifiers may be used to classify the search set documents into search or reference, leveraging the mistakes of the classifier(s) in order to find the target set. If the reference set documents are labeled as 1s and the search set documents are labeled as 0s, then the target set documents are those that are really 1s but were mislabeled as 0s. Since the training data likely contains at least some of these target set documents, the classifiers may be trained on mislabeled data, which may produce inaccurate or biased predictions for the search set, which in turn may affect the rest of the system and the resulting keywords.

There are typically two imperfect ways to handle mislabeled data in classification. The first is to use or develop classifiers that either incorporate the mislabeling process directly or are "robust" to a certain proportion of mislabeling in the data, as described in Hamed Masnadi-Shirazi, Vijay Mahadevan, and Nuno Vasconcelos, "On the Design of Robust Classifiers for Computer Vision," in IEEE International Conference on Computer Vision and Pattern Recognition, pp. 779-786 (2010) and Jakramate Bootkrajang and Ata Kaban, "Label-Noise Robust Logistic Regression and Its Applications," in Machine Learning and Knowledge Discovery in Databases, Springer, pp. 143-158 (2012), the entire disclosure of each of which is incorporated by reference herein. However, these models usually are complex and often hard to estimate. The field of "robust statistics" has developed estimators that are not unduly affected by deviations from model assumptions such as outliers, which is closely related to the problem of mislabeled data. However, the methods developed are largely for estimating regression parameters rather than classification in the machine learning context. The second way of handling mislabeled data, which is more popular in the machine learning literature, is to first preprocess the training data by filtering out suspected mislabeled data before running the classifiers. Various methods of filtering have been suggested using different classifiers (see Jose Salvador Sanchez, Ricardo Barandela, A I Marques, Roberto Alejo, and Jorge Badenas, "Analysis of New Techniques to Obtain Quality Training Sets," Pattern Recognition Letters 24(7):1015-1022 (2003), Xingquan Zhu, Xindong Wu, and Qijun Chen, "Eliminating Class Noise in Large Datasets," in Proceedings of the 20th International Conference on Machine Learning, pp. 920-927 (2003), and Sundara Venkataraman, Dimitris Metaxas, Dmitriy Fradkin, Casimir Kulikowski, and Ilya Muchnik, "Distinguishing Mislabeled Data from Correctly Labeled Data in Classifier Design," in 16TH IEEE International Conference on Tools with Artificial Intelligence, pp. 668-672 (2004), the entire disclosure of each of which is incorporated by reference herein) an ensemble of classifiers (see Carla E. Brodley and Mark A. Friedl, "Identifying Mislabeled Training Data," Journal of Artificial Intelligence Research 11:131-167 (1999) and Sofie Verbaeten and Anneleen Van Assche, "Ensemble Methods for Noise Elimination in Classification Problems," in Multiple Classifier Systems, Springer pp. 317-325 (2003), the entire disclosure of each of which is incorporated by reference herein), or unlabeled data (see Donghai Guan, Weiwei Yuan, Young-Koo Lee, and Sungyoung Lee, "Identifying Mislabeled Training Data with the Aid of Unlabeled Data," Applied Intelligence 35:345-358 (2011), the entire disclosure of which is incorporated by reference herein). However, the filtering option is also not a perfect solution since often the filtering methods themselves are based on the mislabeled data and several mislabeled observations might "mask" each other and remain undetected by the filtering process. Various embodiments of the present invention may handle mislabeled data utilizing either of the two techniques described above. Users may choose to implement classifiers that are robust to mislabeled data and/or also first filter the training data for mislabeled data before training the classifiers.

However, even without implementing any particular techniques to handle mislabeled data, embodiments of the present invention may be fairly robust and produce relevant keywords. The use of multiple classifiers may often reduce the error caused by mislabeled data since different classifiers are differently susceptible and affected by the errors. Furthermore, embodiments of the invention do not strictly require correct probabilities or classifications from the classifiers. Since multiple classifier predictions may be clustered, simply retaining the rank ordering of the probabilities of each search document may be sufficient for the system to approximate the target set and generate useful keywords. Finally, depending on the composition of the search set, the system may only require a small number of target set documents to be clustered together to produce meaningful results.

To show the robustness of systems according to embodiments of the present invention to mislabeled training data, the Mandela Twitter example detailed above is reused with the same reference set. The size of the search set (a subset of which is the target set) was held constant at 5,000 posts. Then, the proportion of the search set that is the target set was varied, and the system utilized a search set with 1%, 10%, 25%, 50%, and 75% of its posts as the target set. Specifically, the system was first utilized with 2 clusters with 4,950 randomly selected non-Mandela related search posts and 50 (1%) randomly selected Mandela-related target set posts tagged with the #Madiba hashtag. Then, 450 #Madiba posts were randomly added and 450 non-Mandela related posts were removed so that the new search set consists of 10% in the target set and so forth. If mislabeled training data highly affects the results, then the problem should increase as the target set proportion increases.

FIG. 15 shows the results on the search sets with different target set proportions. Only Cluster 1 is shown for each run. Since the target set gets larger for each run, the keyword results are not expected to be the same across the different runs. However, notably the topic of keywords across all runs is remarkably stable. With either small or large target sets, the system is still able to pick up keywords relating to Mandela and his passing. Furthermore, the cluster is able to consistently recall a majority of the target set posts and even when precision of the cluster is low, the system still manages to rank Mandela-related keywords highly. Although this example not comprehensive proof of robustness to mislabeling, the results nonetheless suggest that the system is still helpful for users regardless of the level of mislabeling.

Comparative Example

Human beings, unaided by computers, often think they are good at selecting keywords (for example, with an Internet search engine). However, for the slightly more complicated task of choosing a set of keywords to select a target set from a search set, even expert human users are highly unreliable. That is, two human users familiar with the subject area, given the same task, will usually select keyword lists that overlap very little, and each will be a very small subset of those they would recognize as useful after the fact. And, of course, without reliability, validity is not even defined.

This pattern in fact is to be expected given a well-documented but counterintuitive result from psychological research on "inhibitory processes." In many psychological experiments, it has been repeatedly demonstrated that remembering part of a set at some point actually inhibits recall of the rest of the set (see, e.g., Norman J. Slamecka, "An examination of trace storage in free recall," Journal of Experimental Psychology 76(4p1):504 (1968), Henry L. Roediger and James H. Neely, "Retrieval blocks in episodic and semantic memory," Canadian Journal of Psychology/Revue Canadienne de Psychologie 36(2):213 (1982), and Karl-Heinz Bauml, "Inhibitory processes," in Learning and memory: A comprehensive reference, Volume 2: Cognitive psychology of memory, ed. Roediger H. L. Oxford: Elsevier p. 195-220 (2008), the entire disclosure of each of which is incorporated by reference herein.) As relevant to embodiments of the present invention, what appears to happen is that a person may often easily come up with a small number of keywords about some aspect of an event. However, that ease ends quickly and they actually have a considerably more difficult time identifying keywords related to different aspects of the same event.

The fact that the same unreliability also applies to the task of keyword selection was confirmed with a small formal experiment. Specifically, 43 sophisticated individuals (mostly undergraduate students) were asked to enter keywords in a web form with this prompt: "We have 10,000 twitter posts, each containing the word 'health care', from the time period surrounding the Supreme Court decision on Obamacare. Please list any keywords which come to mind that will select posts in this set related to Obamacare and will not select posts unrelated to Obamacare." They were also given access to a sample of the posts and were asked not to consult other sources. This example was repeated with four other substantive examples, some of which are detailed above.

The median number of words selected by the respondents was 8 for the Obamacare example and 7 for an example about the Boston bombings. FIGS. 16A and 16B summarize the results as word clouds of the specific keywords selected. Keywords selected by one respondent and not by anyone else are presented in all capital letters. The position of any one word within a cloud is arbitrary. The results clearly demonstrate the high level of unreliability of human keyword selectors: 66% of the unique words selected in the Obamacare example, and 59% selected in the Boston bombing example, were selected by only one of the 43 respondents (see the masses of words in all capital letters in FIGS. 16A and 16B). The same experiment was conducted with three other examples (regarding Nelson Mandela, the Nigerian schoolgirls kidnapping, and the birth of Kate Middleton's child) and it was found, respectively, that 66%, 76%, and 63% of the unique keywords selected were chosen by only one respondent. Across all five examples, essentially no two respondents chose the same keyword list.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A computer-implemented method of document searching and retrieval in a corpus of documents stored in a database, the method comprising:
   (a) receiving, via a communications interface, a search query (1) comprising at least one reference keyword and (2) pertaining to a pre-determined concept;
   (b) electronically identifying, in response to the search query, a reference set of query-responsive documents each relevant to the pre-determined concept and containing text matching the at least one reference keyword;
   (c) providing an electronically stored search set of documents, wherein (1) each of the documents in the search set is not within the reference set and (2) one or more of the documents in the search set are relevant to the pre-determined concept;
   (d) creating an electronically stored database of documents comprising at least some of the documents from the reference set and at least some of the documents from the search set;
   (e) computationally classifying, by a computer processor and without utilizing the at least one reference keyword, documents in the database into a first classified set documents in the first classified set being predicted to be relevant to the pre-determined concept and comprising documents from the reference set and the search set;
   (f) computationally extracting, by the computer processor, from documents in both the search set and the first classified set, one or more keywords each (1) predicted to be relevant to the pre-determined concept and (2) different from the at least one reference keyword;
   (g) optionally, filtering the extracted keywords; and
   (h) electronically identifying at least some of the documents from the database (1) in response to the search query, (2) via a communications interface, (3) in addition to the electronically identified reference set of documents, and (4) that contain one or more of the extracted keywords.

2. The method of claim 1, wherein the extracted keywords are filtered by:
   displaying one or more of the extracted keywords on a display, and receiving over a communications interface one or more inputs from a user each indicating (1) relevance of one or more extracted keywords or (2) irrelevance of one or more extracted keywords;
   for each extracted keyword indicated as relevant, (1) designating the extracted keyword as a reference keyword and (2) adding documents associated therewith to the reference set of documents; and
   for each extracted keyword indicated as irrelevant, removing documents associated therewith from the search set of documents.

3. The method of claim 2, further comprising displaying one or more documents associated with at least one extracted keyword on the display.

4. The method of claim 1, wherein the extracted keywords are filtered by displaying one or more of the extracted keywords on a display, and receiving over a communications interface one or more inputs from a user each indicating relevance of one or more extracted keywords, further comprising repeating steps (a)-(h) utilizing the one or more relevant extracted keywords as reference keywords.

5. The method of claim 1, further comprising displaying one or more of the documents from the reference set on a display.

6. The method of claim 1, wherein classifying the documents in the database comprises executing with the computer processor a plurality of classifiers each utilizing one or more predictors each comprising text from the documents different from the at least one reference keyword.

7. The method of claim 1, further comprising computationally classifying, by the computer processor and without utilizing the at least one reference keyword, documents in the database into a second classified set, documents in the second classified set being predicted not to be relevant to the pre-determined concept and comprising documents from the search set.

8. The method of claim 7, wherein the second classified set does not comprise documents from the reference set.

9. The method of claim 7, wherein the second classified set comprises documents from the reference set.

10. The method of claim 1, wherein extracting one or more keywords comprises selecting at least one keyword having a frequency of occurrence in documents within both the search set and the first classified set larger than a frequency of occurrence in documents within both the search set and the second classified set.

11. The method of claim 1, wherein classifying the documents in the database comprises computationally clustering at least some of the documents into partitions each intended to approximate a different interpretation of the pre-determined concept.

12. The method of claim 11, wherein one or more keywords are extracted for each partition of documents.

13. The method of claim 11, wherein at least one of steps (f), (g), or (h) is performed for documents clustered into multiple partitions.

14. The method of claim 11, wherein at least one of steps (f), (g), or (h) is performed for documents clustered into only one partition.

15. A system for document searching and retrieval comprising:
   an electronically stored database of documents comprising one or more documents from each of:
      (a) an electronically stored reference set of documents each pertaining to a pre-determined concept and containing text matching at least one reference keyword, and
      (b) an electronically stored search set of documents, wherein (i) each of the documents in the search set is not within the reference set and (ii) one or more of the documents in the search set are relevant to the pre-determined concept;
   an electronically stored database of reference keywords, the database comprising stored computer records specifying, for each reference keyword, documents in the reference set of documents containing text matching the reference keyword;
   a computer processor;
   a classification module, executable by the computer processor, for classifying, without utilizing the at least one reference keyword, documents in the database of documents into a first classified set, documents in the first classified set being predicted to be relevant to the pre-determined concept and comprising documents from the reference set and the search set;

an extraction module, executable by the computer processor, for extracting keywords each (i) predicted to be relevant to the pre-determined concept, (ii) not present in the database of reference keywords, and (iii) associated with one or more documents in the database of documents; and a results module, executable by the computer processor, for identifying at least some of the documents from the database of documents, in response to a search query, that contain one or more of the extracted keywords.

16. The system of claim 15, wherein the results module is configured to display at least one of (i) one or more extracted keywords, (ii) one or more documents associated with an extracted keyword, or (iii) one or more documents in the reference set of documents.

17. The system of claim 15, further comprising a communications interface for at least one of (i) accepting search queries or (ii) accepting user input indicating relevance or irrelevance of extracted keywords.

18. The system of claim 15, wherein the classification module is configured to classify, without utilizing the at least one reference keyword, documents in the database of documents into a second classified set, documents in the second classified set being predicted not to be relevant to the pre-determined concept and comprising documents from the search set.

* * * * *